United States Patent
Akiya et al.

(10) Patent No.: US 9,832,127 B2
(45) Date of Patent: Nov. 28, 2017

(54) LSP PING/TRACE OVER MPLS NETWORKS USING ENTROPY LABELS

(71) Applicant: Cisco Technology, Inc., San Jose, CA (US)

(72) Inventors: Noboshige Akiya, Kanata (CA); George L. Swallow, Boston, MA (US); Carlos M. Pignataro, Raleigh, NC (US); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 86 days.

(21) Appl. No.: 14/935,846

(22) Filed: Nov. 9, 2015

(65) Prior Publication Data

US 2016/0080269 A1    Mar. 17, 2016

Related U.S. Application Data

(63) Continuation of application No. 14/132,781, filed on Dec. 18, 2013, now Pat. No. 9,210,089.

(Continued)

(51) Int. Cl.
*H04L 12/28* (2006.01)
*H04L 12/803* (2013.01)
(Continued)

(52) U.S. Cl.
CPC ............ *H04L 47/125* (2013.01); *H04L 45/24* (2013.01); *H04L 45/50* (2013.01); *H04L 45/507* (2013.01);
(Continued)

(58) Field of Classification Search
CPC ..... H04L 12/723; H04L 12/803; H04L 45/50; H04L 47/125
(Continued)

(56) References Cited

U.S. PATENT DOCUMENTS 7,937,492 B1 * 5/2011 Kompella ............... H04L 45/22
370/351
7,948,986 B1 * 5/2011 Ghosh .................... H04L 45/50
370/392

(Continued)

OTHER PUBLICATIONS

Akiya, N., et al.; "Label Switched Path (LSP) Ping/Trace over MPLS Network Using Entropy Labels (EL)," Oct. 21, 2013 and expires Apr. 24, 2014; pp. 1-15.

(Continued)

*Primary Examiner* — Farah Faroul
(74) *Attorney, Agent, or Firm* — Campbell Stephenson LLP

(57) ABSTRACT

The present disclosure provides for carrying downstream mapping information in an echo request message and/or echo reply message, which can describe both IP (Internet Protocol) multipath information and label multipath information. A transit node (e.g., an LSR element) that receives an echo request message from an initiator node determines downstream mapping information, which is returned to the initiator node. Transit node determines whether a newly defined type of multipath information (type 10) should be generated to return the downstream mapping information, based on whether transit node performs load balancing based on labels or IP header information, and whether transit node imposes entropy labels. A multipath information type 10 element includes either IP multipath information or label multipath information, as well as associated label multipath information that includes one or more entropy labels that map to the IP or label multipath information being returned.

15 Claims, 18 Drawing Sheets

Related U.S. Application Data

(60) Provisional application No. 61/893,490, filed on Oct. 21, 2013.

(51) Int. Cl.
*H04L 12/723* (2013.01)
*H04L 12/707* (2013.01)
*H04L 12/801* (2013.01)
*H04L 12/753* (2013.01)

(52) U.S. Cl.
CPC ............ *H04L 47/122* (2013.01); *H04L 45/48* (2013.01); *H04L 47/12* (2013.01)

(58) Field of Classification Search
USPC .................................................. 370/248, 256
See application file for complete search history.

(56) References Cited

U.S. PATENT DOCUMENTS

| | | | | |
|---|---|---|---|---|
| 8,139,479 | B1* | 3/2012 | Raszuk | H04L 43/0811 370/217 |
| 9,178,810 | B1* | 11/2015 | Singh | H04L 45/50 |
| 2008/0247324 | A1* | 10/2008 | Nadeau | H04L 41/12 370/245 |
| 2011/0164501 | A1 | 7/2011 | Dunbar | 370/236.2 |
| 2011/0164503 | A1* | 7/2011 | Yong | H04L 69/22 370/237 |
| 2013/0107712 | A1* | 5/2013 | Allan | H04L 45/24 370/235 |
| 2013/0343204 | A1 | 12/2013 | Geib et al. | 370/248 |
| 2014/0226662 | A1 | 8/2014 | Frost et al. | 370/392 |
| 2015/0003255 | A1 | 1/2015 | Frost et al. | 370/238 |
| 2015/0029849 | A1 | 1/2015 | Frost et al. | 370/235 |
| 2015/0029872 | A1 | 1/2015 | Pignataro et al. | 370/252 |
| 2015/0030020 | A1 | 1/2015 | Kini et al. | 370/389 |
| 2015/0092593 | A1* | 4/2015 | Kompella | H04L 45/50 370/254 |
| 2015/0131660 | A1* | 5/2015 | Shepherd | H04L 45/74 370/390 |
| 2015/0200843 | A1 | 7/2015 | Frost et al. | 370/238 |
| 2015/0222531 | A1 | 8/2015 | Budhia et al. | 370/229 |
| 2016/0020941 | A1* | 1/2016 | Asati | H04L 41/0659 370/228 |
| 2016/0087884 | A1* | 3/2016 | Xu | H04L 12/4633 370/392 |
| 2016/0261492 | A1* | 9/2016 | Xiao | H04L 41/0686 |
| 2016/0294987 | A1* | 10/2016 | Tian | H04L 69/22 |

OTHER PUBLICATIONS

Akiya, N., et al.; "Label Switched Path (LSP) Ping/Trace over MPLS Network Using Entropy Labels (EL)," Dec. 15, 2013 and expires Jun. 18, 2014; pp. 1-17.

Bahadur N., et al.; "Mechanism for Performing Label Switched Path Ping (LSP Ping) over MPLS Tunnels"; Request for Comments 4379; Nov. 2011;, pp. 1-23.

Bryant, Ed, et al.; "Flow-Aware Transport of Pseudowires Over an MPLS Packet Switched Network"; Request for Comments 6391; Nov. 2011; pp. 1-19.

Kompella, K., et al.; "Detecting Multi-Protocol Label Switched (MPLS) Data Plane Failures"; Request for Comments 4379; Feb. 2006; pp. 1-50.

Kompella, K., et al.; "The Use of Entropy Labels in MPLS Forwarding"; Request for Comments 6790; Nov. 2012; pp. 1-25.

* cited by examiner

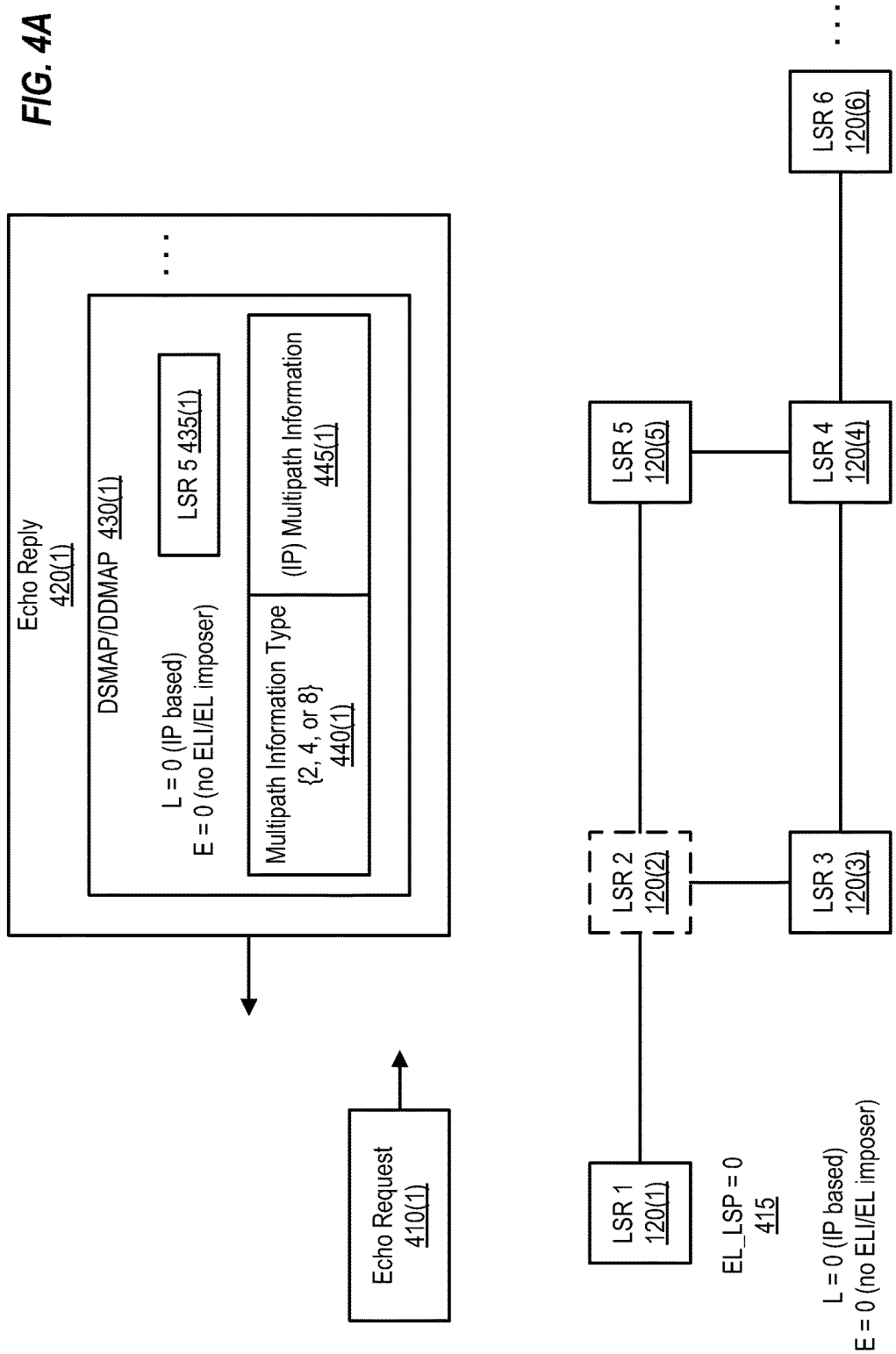

LSP PING/TRACE OVER MPLS NETWORKS USING ENTROPY LABELS

RELATED INFORMATION

The present patent application is a continuation of and is related to U.S. patent application Ser. No. 14/132,781, filed on Dec. 18, 2013, entitled "LSP Ping/Trace Over MPLS Networks Using Entropy Labels"; which claims benefit to U.S. Provisional Application No. 61/893,490, entitled "Label Switched Path (LSP) Ping/Trace Over MPLS Networks Using Entropy Labels (EL), filed Oct. 21, 2013. Both are incorporated by reference herein in their entirety and for all purposes.

TECHNICAL FIELD

The present disclosure relates generally to MPLS (multiprotocol label switching) protocols and, more particularly, to performing LSP (label switched path) connectivity tests using entropy labels.

BACKGROUND

Businesses employ networks to interconnect their computers, servers, storage devices, and other network elements. As a business grows, so can its network, increasing the number of network elements coupled to the network, the number of network links, and also geographic diversity. A business' network elements can be scattered throughout a city, a state, a country, or the world. Many businesses establish connectivity between network elements at disparate geographic sites using various intermediate networked areas or domains, such as a third party provider's network. In order for the various intermediate networked domains to provide end-to-end connectivity between a business' network elements, connectivity tests may be performed to validate data transmission along paths through the various intermediate networked domains.

BRIEF DESCRIPTION OF THE DRAWINGS

A more complete understanding of the present disclosure may be acquired by referring to the following description and accompanying drawings, in which like references numbers indicate like features.

FIG. 4A-4D are block diagrams illustrating example message exchanges during an example connectivity test implementing the present disclosure, according to one embodiment.

Figure 1:
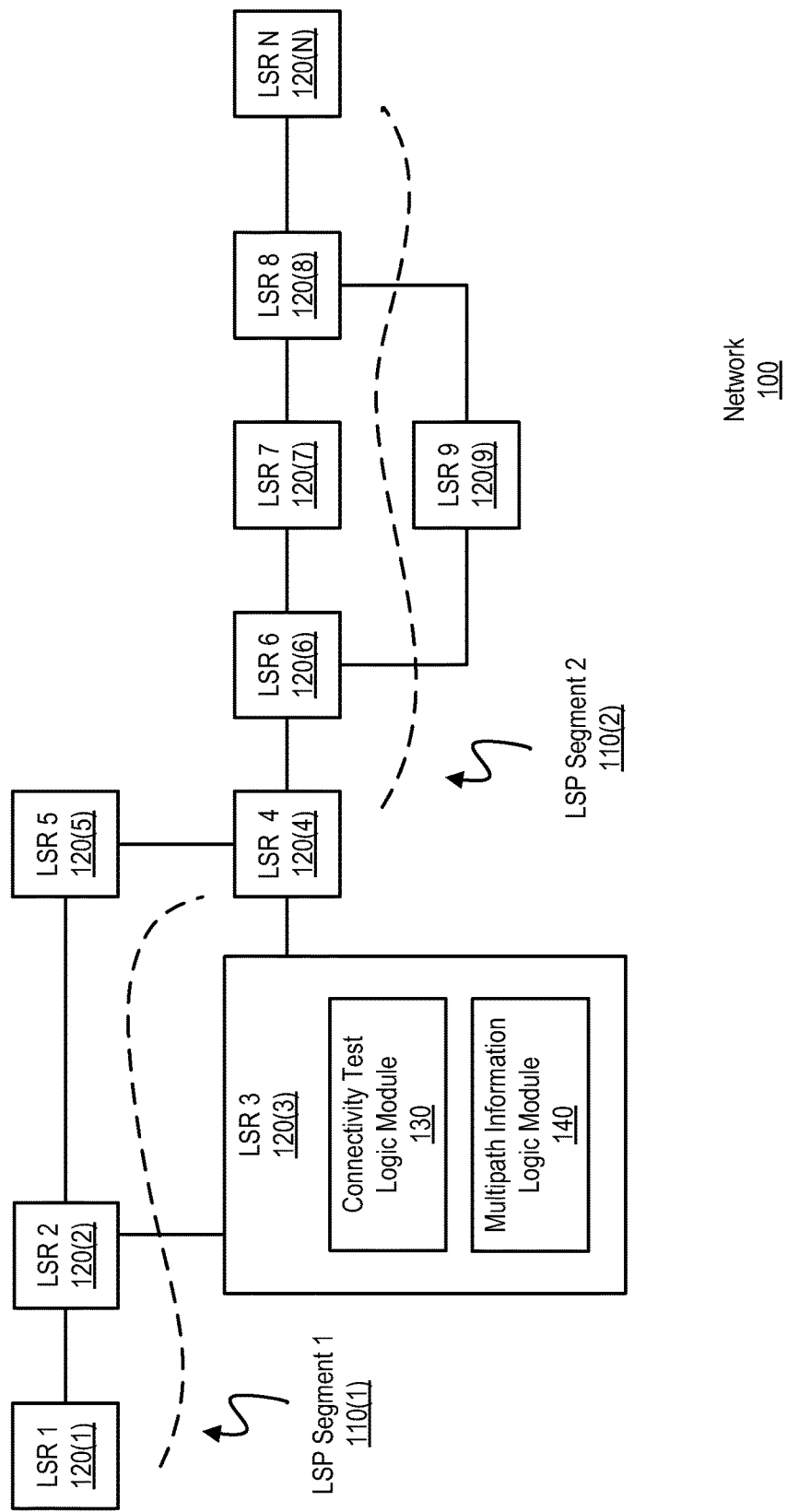
FIG. 1 is a block diagram illustrating components of an example network in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents and alternative falling within the spirit and scope of the present disclosure as defined by the appended claims.

DETAILED DESCRIPTION

Overview

The present disclosure provides for carrying downstream mapping information in an echo request message and/or echo reply message, which can describe both IP (Internet Protocol) multipath information and label multipath information. A label switching routing element (LSR) that receives an echo request message from an initiator node determines downstream mapping information. The receiving LSR determines whether a newly defined type of multipath information (type 10) should be generated and returned to the initiator in an echo reply message, based on whether the receiving LSR performs load balancing based on labels or on information extracted from a packet's IP header and whether the receiving LSR imposes entropy labels. A receiving LSR can return, using a multipath information type 10 element, either IP multipath information and label multipath information, as well as associated label multipath information that includes one or more entropy labels that map to the IP or label multipath information being returned.

Example Embodiments

FIG. 1 is a block diagram illustrating components of an example network 100 in which the present disclosure can be implemented. Network 100 can include one or more network segments (not shown) that implement MPLS (multi-protocol label switching) and a number of label switching routing elements (LSRs) 120(1)-(N). Network 100 can also implement Inter-AS (Autonomous System) VPN (Virtual Private Network), Seamless/Unified MPLS, and Carrier Supporting Carrier (CSC). Examples of a network segment include an autonomous system (AS), a customer network, a service provider network, a customer carrier network, a backbone network, a transport network, a core network, a network, a sub-network, an aggregate domain, a core domain, an access domain, a networked area, and/or a routing domain.

Label switching routing elements (LSRs) 120(1)-(N) are located in one or more network segments (not shown). Each LSR 120 is configured to implement a routing protocol (e.g., an interior routing protocol, such as IGP (Interior Gateway Protocol), OSPF (Open Shortest Path First), IS-IS (Intermediate System to Intermediate System), EIGRP (Enhanced Interior Gateway Routing Protocol), and the like). Each LSR 120 is configured to exchange routing information with other LSRs and store the routing information in one or more local IP (Internet Protocol) routing tables, where the routing information is used to reach various destinations in network 100.

A label switched path (LSP) can be built across network 100 (and across one or more network segments) from at least one ingress LSR (or an edge LSR of network 100 where packets enter the LSP) to at least one egress LSR (or an edge LSR of network 100 where packets exit the LSP), which passes through one or more transit LSRs. Each LSP is defined by a set of labels. Labels are short, fixed length, locally significant identifiers that are used to identify a Forwarding Equivalence Class (FEC). An FEC represents packets that share a same requirement for transport (e.g., over the same path with the same forwarding treatment). Each LSP is associated with at least one FEC that specifies which packets are mapped to that LSP. In order to build an LSP, each LSR is configured to exchange labels with one another using one or more label distribution protocols (e.g., using LDP (Label Distribution Protocol), BGP-4 (Border Gateway Protocol version 4), RSVP-TE (Resource Reservation Protocol-Traffic Engineering), CR-LDP (Constraint-based Routing Label Distribution Protocol), and the like). Each LSR stores the labels in one or more forwarding tables, such as a label information base (LIB) and/or a label forwarding information base (LFIB), and uses the labels to forward (or label switch) a packet along an LSP toward the packet's destination.

A LSP can also be built by stitching together two or more LSP segments at an LSR, where the LSR is configured to receive packets on one LSP segment and forward the packets on the second LSP segment (e.g., by modifying the LFIB to perform label swap). FIG. 1 illustrates an LSP that has ingress LSR 1 120(1) and egress LSR N 110(N), and includes LSP segment 1 110(1) and LSP segment 2 110(2). LSP segment 1 spans LSRs 120(1), 120(2), 120(3), 120(4), and 120(5), and LSP segment 2 110(2) spans LSRs 120(4), 120(6), 120(7), 120(8), 120(9) and 120(N). Both LSP segments 110(1) and 110(2) have two ECMP (equal cost multipath) paths. In LSP segments 110(1), there are two ECMP paths from LSR2 to LSR4, one passing through LSR 5 and the other passing through LSR3. In LSP segment 110(2), there are two ECMP paths from LSR 6 to LSR 8, one passing through LSR7 and the other passing through LSR 9.

ECMP Load Balancing

Service providers often use Equal-Cost Multi-Path (ECMP) to balance traffic across a network by allowing the traffic to take multiple paths to reach a destination. ECMP is used between two nodes, or LSRs, that are separated by one or more hops. Load balancing occurs over several shortest paths in the network, typically obtained by arranging IGP (Interior Gateway Protocol) metrics to define at least two equal cost paths between the pair of LSRs. One important requirement for load balancing is that packets belonging to a given "flow" are mapped to the same path, or the same sequence of links across the network (in order to avoid jitter, latency, and re-ordering issues for the flow). To meet this requirement, an LSR uses specified fields within a packet's header, called "keys," as input to a load balancing algorithm, which is typically a hash function configured to operate on the specified IP keys. A same set of keys that are input to the load balancing algorithm will produce a same hash value. The hash value is used to select an entry from a forwarding table that contains the path (e.g., a modulo operation performed on the hash value using the number of table entries to return a value used to select the entry), where the same path will be selected for all packets in a given flow. The keys chosen for the load balancing algorithm depend on the packet type. A typical set of keys for IP packets is a 5-tuple of the IP source and destination addresses, the protocol type, and the source and destination port numbers. Examples of a flow include (but are not limited to) a Transmission Control Protocol (TCP) session, a Layer 2 Tunneling Protocol (L2TP) session corresponding to a broadband user, or traffic within an Asynchronous Transfer Mode (ATM) virtual circuit (VC).

Due to encapsulation in MPLS (Multiprotocol Label Switching) networks, transit LSRs of an LSP may need to perform fairly deep inspection of packets to find these keys (e.g., traversing the label stack to extract the keys from the IP header). One way to eliminate the need for this deep inspection is to have the ingress LSR of an LSP extract the appropriate keys from a given packet, input them to its load balancing algorithm, and place the result in an additional label, called an "entropy label," as part of the MPLS label stack pushed onto the packet. The entropy label is at the bottom of the MPLS label stack with Bottom of Stack (BoS or S bit) set to 1. The entropy label (EL) carries load balancing information and is not used for forwarding decisions. The transit LSR can perform load balancing solely based on the EL or can use one or more labels in the packet's label stack as specified keys in the transit LSR's load balancing algorithm (such as a hash function configured to operate on the specified label keys), which avoids deep packet inspection. Entropy labels are further described in RFC 6790.

In some applications (such as MPLS Virtual Private Network (VPN) or Layer 2 VPN), an application label (such as VPN label for MPLS VPN or virtual circuit (VC) label for Layer 2 VPN) that is usually at the bottom of the stack will no longer be with at the bottom of the stack (in other words, will have BoS=0 instead of BoS=1). An egress LSR that supports entropy labels recognizes that, when receiving an MPLS packet with an application label with BoS=0, there is actually an additional (entropy) label at the bottom of the stack that needs to be popped before the IP packet is forwarded.

In other applications (such as Carrier Supporting Carrier (CsC) VPN), an egress provider edge (PE) router (or egress LSR of an LSP) in a backbone carrier provider network segment will pop the application label, which always has BoS=0. In such a case, the egress PE will not recognize that there is an additional (entropy) label that needs to be popped. To distinguish the entropy label from application labels, an entropy label indicator (ELI) is used to indicate to the egress PE that an entropy label is present in the label stack. On the control plane, the egress PE will indicate an ELI value in a label assignment sent to remote ingress PE devices. An ingress PE (or ingress LSR of an LSP) that wishes to forward a packet to the egress PE will push an entropy label with BoS=1 on the packet and will push an ELI label with BoS=0 and TTL=0 on top of the entropy label.

The egress PE that receives the packet will check if the application label has BoS=1. If the application label is not at the bottom of the stack (or has BoS=0), the egress PE checks if the bottom label is set with BoS=0 and TTL=0, which indicates the ELI label. In such a case, the egress PE confirms whether the ELI value in the ELI label matches the value (previously) advertised by the egress PE. The egress PE also checks if the bottom label is set with BoS=1 and TTL=0, which indicates the entropy label. The egress PE removes the entropy label and ELI label before forwarding the IP packet to the customer edge (CE) router in a customer carrier network segment.

In other applications (such as seamless MPLS), two or more LSP segments can be stitched together to form a single end to end (e2e) LSP. MPLS packets flow over the e2e LSP, which have been setup using multiple different protocols by stitching together LSP segments that each span various network segments, such as aggregation, transport, and core segments. Some of the LSP segments in the e2e LSP may or may not intrinsically support entropy labels and entropy label indicators, as discussed above. The transit LSRs of an e2e LSP may perform label balancing using the label stack or using the IP header.

LSP Connectivity Tests

Each LSR 120 implements connectivity test logic module 130, which implements MPLS LSP connectivity test protocol. Connectivity test protocol is used to detect data plane failures in LSPs by exchanging MPLS echo request messages and MPLS echo reply messages. For example, an end-to-end connectivity test of an LSP can be performed in LSP ping mode to detect a fault within the LSP, while a transit connectivity test of an LSP can be performed in LSP traceroute mode to localize the fault. LSP ping/traceroute is a key (and often mandatory) OAM (Operations, Administration, and Management) functionality for many MPLS technologies.

A connectivity test, such as LSP ping or traceroute described in RFC 4379, can be performed by an ingress LSR of the LSP acting as an initiator node (or the node that initiates the connectivity test) to trace and validate (or exercise) all ECMP paths between the ingress LSR and an egress LSR of the LSP. A packet called an echo request is sent along the same path as other packets belonging to a given flow, where the echo request includes information identifying the flow (e.g., identified by an FEC). The connectivity test is generally successful when the echo request is received at an edge LSR that is verified to be the egress LSR for the flow identified in the echo request.

In LSP ping mode, the initiator LSR tests end-to-end connectivity of an LSP by originating an echo request that has a TTL (time to live) in the outermost label set to 255. The initiator LSR sends the echo request toward the egress LSR of the LSP being tested. Transit LSRs forward the echo request along the LSP toward an edge LSR believed to be the egress LSR for the flow identified in the echo request. The edge LSR verifies whether the edge LSR is indeed an egress LSR for the flow identified in the echo request. The egress LSR acts as a responder node and sends an echo reply back to the initiator LSR.

In LSP traceroute mode, the initiator LSR tests an LSP to isolate any faults by originating an echo request that has an incrementing TTL, where each subsequent echo request originated by the initiator LSR includes a TTL that is set successively to 1, 2, and so on. An LSR that receives the echo request verifies whether the LSR is indeed a transit LSR for the flow identified in the echo request. The transit LSR acts as a responder node and sends an echo reply to the initiator LSR, where each echo reply includes downstream mapping information from the responding transit LSR. The downstream mapping information describes how the flow is forwarded to one or more downstream LSRs of the responding transit LSR.

Downstream mapping information includes multipath information, which describes how the flow may be forwarded along different paths (such as ECMP paths) of the LSP. Multipath information includes one or more destination IP addresses or one or more labels that are used to reach each downstream LSR on the different ECMP paths. The multipath information is used by the initiator to discover and exercise (or trace and validate) the ECMP paths of the LSP. The downstream mapping information is accumulated by the initiator LSR, which copies over the downstream mapping information received from a responding transit LSR into a subsequent echo request (as well as increments TTL by one). Multipath information is carried in a downstream mapping (DSMAP) TLV (type-length-value) element (described in RFC 4379) or a downstream detailed mapping (DDMAP) TLV element (described in RFC 6424), depending on the version of LSP ping/trace that is implemented in the network. Multipath information types {2, 4, and 8} indicate that the multipath information carried in the DDMAP or DSMAP is a set of one or more IP addresses, while multipath information type {9} indicates that the multipath information is a set of one or more labels. Multipath information type {0} indicates that the multipath information is empty or set to NULL value.

Connectivity test logic module 130 is able to successfully perform validation of the ECMP paths when all transit LSRs along the ECMP paths (between the ingress LSR and egress LSR) use the same set of keys to perform load balancing, where the transit LSRs perform load balancing using either information extracted from the header (IP based load balancing) or the information carried in the label stack (label based load balancing). For example, a transit LSR receives an echo request that includes a set of IP addresses (specified by the initiator LSR). If the transit LSR implements IP based load balancing, the transit LSR uses the IP based load balancing algorithm to determine whether any of the (received) set of IP addresses would be forwarded to any downstream LSRs (also referred to as determining whether any of the set of IP addresses map to any downstream LSRs or match any downstream LSRs). Similarly, if the transit LSR receives a set of labels (specified by the initiator) and the transit LSR implements label based load balancing, the transit LSR uses the label based load balancing algorithm to determine whether any of the set of labels map to or match any downstream LSRs.

If none of the received IP addresses or labels map to any downstream LSR, the transit LSR returns empty multipath information. Otherwise, the transit LSR returns the determined multipath information for each downstream LSR, either as one or more sets of IP addresses that are each mapped to a downstream LSR or as one or more sets of labels that are each mapped to a downstream LSR. As the initiator LSR accumulates the downstream mapping information from all LSRs along the LSP, the initiator builds associations between the various sets of multipath information received from the transit LSRs and identifies (or maps out) the various ECMP paths on the LSP being tested. The initiator LSR is then able to determine a specific IP address or a specific label that can be used to exercise a particular ECMP path on the responder LSR (e.g., a specific IP address or label that is known to reach the egress LSR along a particular ECMP path).

However, in a scenario where a transit LSR that implements IP based load balancing receives a set of labels, the transit LSR cannot determine whether any of the set of labels map to any downstream LSRs because the transit LSR cannot use a label as a key to an IP based load balancing algorithm. Similarly, when a transit LSR that implements label based load balancing receives a set of IP addresses, the transit LSR cannot determine whether any of the set of IP addresses map to any downstream LSRs, because the transit LSR cannot use an IP address as a key to a label based load balancing algorithm. In such a scenario, the transit LSR returns empty multipath information to the initiator.

Further, the transit LSR may support the use of entropy labels (also referred to as supporting or implementing ELI/EL) but may be configured to continue performing IP based load balancing. This scenario is quite common due to varying degrees of implementation of entropy labels (e.g., due to time, manpower, and budgetary restraints of a service provider when upgrading or replacing LSRs to implement entropy labels). In such a scenario, the transit LSR returns empty multipath information to the initiator when a set of labels are received.

An initiator that receives empty multipath information does not know whether none of the provided set of IP addresses or set of labels (which were sent to the transit LSR in the echo request message) mapping to a downstream LSR, or whether the transit LSR implements a load balancing algorithm that is incompatible with the information sent to the transit LSR.

Accordingly, if transit LSRs along the ECMP paths perform load balancing in differing manners (such as some LSRs implement IP based load balancing, while others implement label based load balancing), connectivity test logic module 130 may be unable to trace and validate all ECMP paths in LSPs where a transit LSR implements a load balancing algorithm that is incompatible with the multipath information the transit LSR receives. For example, connectivity test logic module 130 may be unable to trace and validate all ECMP paths in two scenarios where entropy labels are used:

(1) where one or more transit LSRs are located along an LSP that implements ELI/EL (and performs label based load balancing), but the one or more transit LSRs perform IP based load balancing. This scenario occurs because the one or more transit LSRs do not implement RFC 6790 (load balancing using entropy labels) or implement aspects of RFC 6790 without implementing the suggested transit LSR behavior described in section 4.3 of RFC 6790 (which describes using label stack keys for the load balancing algorithm). A similar situation includes one or more transit LSRs that are located along an LSP that does not implement ELI/EL (and performs IP based load balancing), but the one or more transit LSRs perform label based load balancing (and implements ELI/EL).

(2) where two or more LSP segments are stitched together with at least one LSP segment implementing ELI/EL. This scenario occurs in seamless MPLS, as described in [I-D.ravisingh-mpls-el-for-seamless-mpls].

The present disclosure provides a new multipath information type, multipath type 10, for use in a DSMAP or DDMAP of LSP echo request and reply messages in order to restore the ability for LSP ping and traceroute connectivity tests to trace and validate ECMP paths of an LSP that implements entropy labels. In echo request messages, a multipath information type 10 sub-TLV (type-length-value) element (or simply a multipath type 10 element) is used to query an LSR about multipath information carried in the multipath type 10 element, which includes both a set of IP addresses and a set of labels specified by an initiator. In echo reply messages, a multipath type 10 element is also used to carry responsive multipath information that includes either a set of IP addresses or a set of labels determined (by the responder) to map to downstream LSRs, as well as a set of associated label multipath information that describes a set of labels (such as entropy labels) that map to the set of IP addresses or labels included in the multipath type 10 element. The present disclosure also provides for new DS flags that are used to inform the initiator about the load balancing algorithm (and the keys) used by the transit LSR. The multipath type 10 element and new DS flags are used to disambiguate the above-discussed scenarios where empty multipath information is returned (e.g., due to IP addresses/labels that do not map to downstream LSRs or due to use of an incompatible load balance algorithm).

All LSRs along a given LSP are configured to implement the new DS flags and multipath type 10 element. This extension to MPLS LSP connectivity test logic that implements the new multipath type 10 element and new DS flags is illustrated as multipath information logic module 140, which is also implemented on each LSR 120. The new multipath type provides additional flexibility and can be used as a super-set and a generalization of previously defined multipath types. Conventional OAM functionality may be limited when testing an LSP that implements entropy capability (EL), which the present disclosure restores to full OAM functionality on such LSPs in the presence of entropy labels (as well as in seamless MPLS with EL and mixed networks). Multipath information logic module 140 is further described below in connection with FIG. 2.

Network 100 can utilize Ethernet, IEEE 802.11x, or some other communications protocol. In light of the present disclosure, it will be appreciated that network 100 can include other components such as routers, firewalls and the like that are not germane to the discussion of the present disclosure and will not be discussed further herein. It will also be appreciated that other configurations are possible. For example, a much larger number of network segments, LSP segments 110(1)-(N), and/or LSRs 120(1)-(N) than the number shown can be implemented in the network, and so on.

The letter N is used to indicate a variable number of devices or components. For example, a variable number of LSP segments 110(1)-(N), and LSRs 120(1)-(N) are implemented in the network. Although the letter N is used in describing a variable number of instances of each of these different devices and components, a repeated use of the letter N does not necessarily indicate that each device and component has a same number of N instances implemented in the network.

Figure 2:
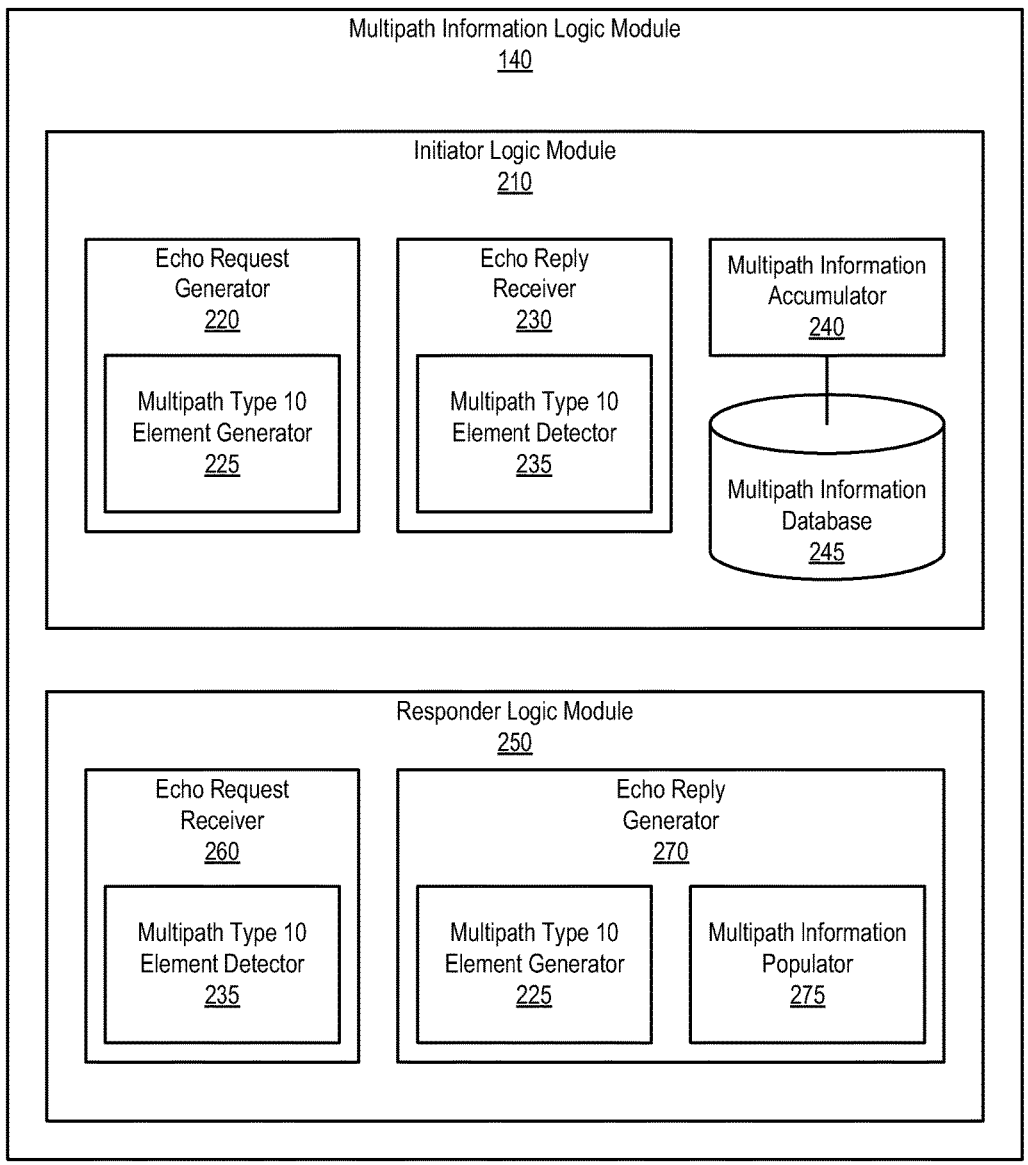
FIG. 2 is a block diagram illustrating components of an example multipath information logic module in which the present disclosure can be implemented, according to one embodiment.

FIG. 2 is a block diagram illustrating components of an example multipath information logic module 140 in which the present disclosure can be implemented. Multipath information logic module 140 is configured to be implemented on an LSR 120 and is configured to communicate with an existing MPLS connectivity test logic module 130 also implemented on the LSR 120. Multipath information logic module 140 includes an initiator logic module 210 and a responder logic module 250, which are further described below. Multipath information logic module 140 and connectivity test logic module 130 are configured to cooperatively implement the procedures discussed in RFC 4379 and/or RFC 6424, as extended by the present disclosure.

Message processing implemented by initiator logic module 210 is configured to be triggered when receipt of a message, such as receipt of a connectivity test initiation message or an echo reply message, is detected at a port of the initiator LSR. Message processing implemented by initiator logic module 210 is further described below in connection with FIGS. 5A and 5B.

Initiator logic module 210 includes an echo request generator 220, an echo reply receiver 230, a multipath information accumulator 240, and a multipath information database 245. Echo request generator 220 is configured to generate an echo request message in cooperation with connectivity test logic module 130 (e.g., according to the procedures discussed in RFC 4379 and/or RFC 6424, as implemented in network 100) and to forward the echo request message toward the egress LSR of the LSP being tested. While being generated (and populated with multipath information), echo request messages can be stored locally at echo request generator 220, such as in memory (e.g., a buffer or other temporary storage).

Echo reply receiver 230 is configured to receive an echo reply from a responder LSR. Echo reply messages can be stored locally at echo reply receiver 230, such as in memory (e.g., a buffer or other temporary storage). Echo reply receiver 230 includes a multipath type 10 element detector 235, which is configured detect whether the multipath information in the received echo reply is stored in a multipath type 10 element. Echo reply receiver 230 indicates to echo request generator 220 (where receiver 230 and generator 220 are communicatively coupled to one another) whether the received echo reply message includes multipath information type 10. Echo reply receiver 230 is also configured to update a new variable, EL_LSP, based on the new DS flags received in the echo reply (which can include multipath information types $\{0, 2, 4, 8, 9$ or $10\}$). EL_LSP, which is maintained at the initiator, indicates when the initiator should send echo requests with multipath information type 10. Multipath type 10 element, the new DS flags, and EL_LSP variable are further described below in connection with FIG. 3 and FIG. 4A-4D.

Echo request generator 220 is also configured to generate a subsequent echo request message, depending on the type of multipath information included in the (presently) received echo reply message. Echo request generator 220 is configured to generate an echo request that includes multipath information of type $\{2, 4, 8,$ or $9\}$, in cooperation with connectivity test logic module 130 (e.g., according to the procedures discussed in RFC 4379 and/or RFC 6424, as implemented in network 100). Echo request generator 220 also includes a multipath type 10 element generator 225, which is configured to generate a multipath type 10 element, populate the multipath type 10 element (such as by copying multipath information of the received echo reply message into appropriate multipath sections of the multipath type 10 element), and insert the multipath type 10 element into the subsequent echo request message. In another embodiment, the multipath type 10 element is populated in the echo request message. Echo request generator 220 is also configured to forward the generated echo request message toward the egress LSR.

Multipath information accumulator 240 is configured to extract multipath information from the received echo reply stored at echo reply receiver 230, where multipath information accumulator 240 and echo reply receiver 230 are communicatively coupled. Multipath information accumulator is configured to add the multipath information to multipath information database 245, which is a collection of organized data located on one or more storage devices (e.g., a single storage device or a collection of storage devices). A storage device can be implemented using network attached storage (NAS), file servers, storage filers, a storage area network (SAN), and the like. Multipath information database 245 includes both IP multipath information (or a set of one or more IP addresses) and label multipath information (or a set of one or more labels). As multipath information is received from the transit LSRs of the LSP being tested and the multipath information database is built, the initiator discovers the various paths (such as ECMP paths) that reach a target (or the egress LSR of the LSP). The initiator can determine specific IP address or label obtained from multipath information database 245 (where the specific IP address or label was originally obtained from a transmit LSR on the particular ECMP path) to exercise a particular ECMP path.

Message processing implemented by responder logic module 250 is configured to be triggered when receipt of an echo request message is detected at a port of the receiving LSR (also referred to as the responding LSR). Message processing implemented by responder logic module 250 is further described below in connection with FIG. 6-9B.

Responder logic module 250 includes an echo request receiver 260 and an echo reply generator 270. Echo request messages can be stored locally at echo request receiver 260, such as in memory (e.g., a buffer or other temporary storage). Echo request receiver 260 is configured to receive an echo request from an initiator LSR. Echo request receiver 260 includes a multipath type 10 element detector 235, which is configured detect whether the multipath information in the received echo request is stored in a multipath type 10 element. Echo request receiver 260 indicates to echo reply generator 270 (where receiver 260 and generator 270 are communicatively coupled to one another) whether the received echo request message includes multipath information type 10.

Echo reply generator 270 is configured to generate an echo reply message in response to receiving the echo request message, depending on the type of multipath information included in the (presently) received echo request message. While being generated (and populated with multipath information), echo reply messages can be stored locally at echo reply generator 270, such as in memory (e.g., a buffer or other temporary storage). Echo reply generator 270 is configured to generate an echo reply that includes multipath information of type $\{0, 2, 4, 8$ or $9\}$, in cooperation with connectivity test logic module 130 (e.g., according to the procedures discussed in RFC 4379 and/or RFC 6424, as implemented in network 100). Echo reply generator 270 is also configured to generate an echo reply message that includes multipath type 10 element. Echo reply generator 270 includes a multipath type 10 element generator 225 that is configured to generate a multipath type 10 element.

Echo reply generator 270 also includes a multipath information populator 275 (or simply populator 275) that is configured to populate the multipath type 10 element with downstream mapping information of the receiving LSR. The downstream mapping information is used to reach the receiving LSR's downstream LSRs, and includes returning IP multipath information and/or returning label multipath information. Populator 275 is configured to consult forwarding and/or routing tables of the transit LSR to determine the returning IP multipath information (which includes one or more IP addresses) that each map to a set of IP addresses included in a received echo request. Populator 275 is also configured to consult the forwarding and/or routing tables to determine the returning label multipath information (which includes one or more labels) that each map to a set of labels included in a received echo request. Populator 275 is also configured to determine whether the receiving LSR has any entropy labels that map to the returning IP or label multipath information. Populator 275 is configured to determine the set of entropy labels depending on the load balancing state of the receiving LSR, and in some scenarios, also depending on whether new ELs or carried-over ELs are imposed. Populator 275 is also configured to insert the returning IP multipath information, returning label multipath information, and/or entropy label information into the multipath type 10 element. Once the multipath type 10 element is populated, multipath type 10 element generator 225 is configured to insert the element into the DDMAP/DSMAP.

Echo reply generator 270 is also configured to determine load balancing state of the responding LSR, based on the load balance technique used by the responding LSR and whether the responding LSR imposes ELI/EL labels. Echo reply generator 270 is also configured to set zero, one, or both new DS flags L and E in a DDMAP or a DSMAP (depending on the implementation of RFC 4379 and/or RFC 6424 in network 100) to reflect the load balancing state. The new DS flags indicate the capabilities of the receiving (and responding) LSR to the initiator, as further described below in connection with FIG. 3. Echo reply generator 270 is also configured to insert the DDMAP/DSMAP insert into echo reply message. Echo reply generator 270 is also configured to forward the echo reply message toward the initiator LSR. Example message exchanges between an initiator LSR and responding LSRs are further described below in connection with FIG. 4A-4D.

Figure 3:
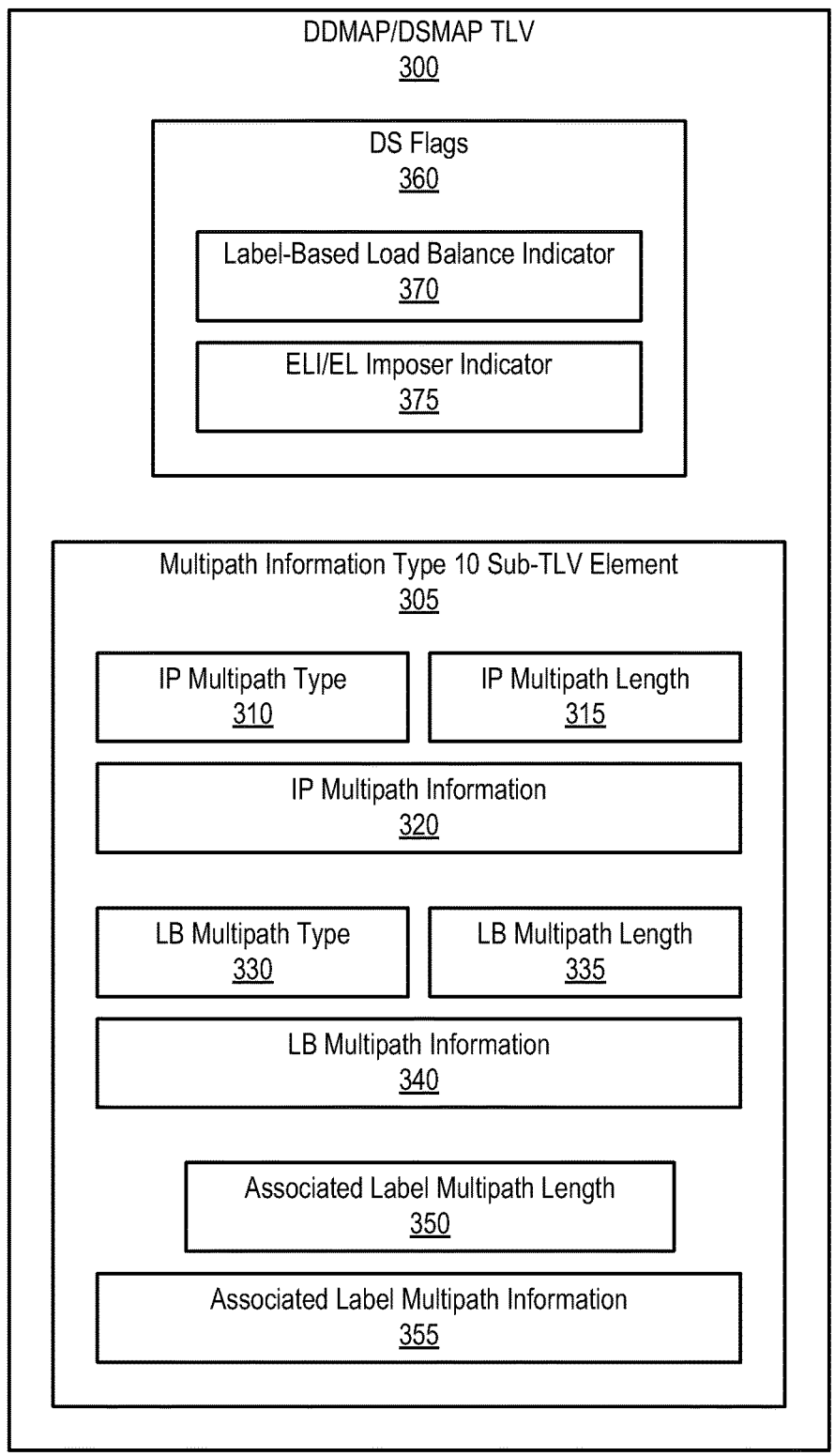
FIG. 3 is a block diagram illustrating components of an example multipath information type 10 sub-TLV element and examples of new DS flags that are included in a DDMAP/DSMAP TLV, according to one embodiment.

FIG. 3 is a block diagram illustrating components of an example multipath information type 10 sub-TLV and new DS flags that extends aspects of the DSMAP discussed in RFC 4379 (in section 3.3) and DDMAP discussed in RFC 6424 (in section 3.3). As illustrated, multipath information type 10 sub-TLV element 305 (also referred to as a multipath type 10 element) is included in a DDMAP/DSMAP TLV 300, which in turn is included in an echo request message or an echo response message.

A new multipath type number is defined for use in DSMAP/DDMAP TLVs. The new multipath type has value of 10, which indicates that the multipath information included in a given DSMAP/DDMAP will include a set of IP addresses and labels. The new multipath type is illustrated below. The remaining multipath types of {0, 2, 4, 8, and 9} that are implemented by multipath information logic module (discussed below) continue to be implemented according to RFC 4379 and/or 6424.

TABLE 1

| Multipath Type 10 | | |
|---|---|---|
| Key | Type | Multipath Information |
| 10 | IP and label set | IP addresses and label prefixes |

Although not shown, the DSMAP/DDMAP that contains multipath type 10 element 305 also includes a multipath length that indicates the length of the multipath type 10 element included in the DSMAP/DDMAP. Multipath information type 10 includes three sections: an IP multipath information section, a label multipath information section, and an associated label multipath information section. The components of multipath type 10 element are illustrated in FIG. 3, as well as in the format illustration below.

TABLE 2

```
                         Multipath Type 10 Element
 0                     1                     2                     3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   IPMultipathType   |   Reserved(MBZ)   |     IP Multipath Length     |
+-+-+-+-+-+-+-+-+-+-+-+-+-+-+-+-+-+-+-+-+-+-+-+-+-+-+-+-+-+-+-+-+
~                                                                ~
|                     (IP Multipath Information)                 |
~                                                                ~
+-+-+-+-+-+-+-+-+-+-+-+-+-+-+-+-+-+-+-+-+-+-+-+-+-+-+-+-+-+-+-+-+
|   LbMultipathType   |   Reserved(MBZ)   |   Label Multipath Length    |
+-+-+-+-+-+-+-+-+-+-+-+-+-+-+-+-+-+-+-+-+-+-+-+-+-+-+-+-+-+-+-+-+
~                                                                ~
|                     (Label Multipath Information)              |
~                                                                ~
+-+-+-+-+-+-+-+-+-+-+-+-+-+-+-+-+-+-+-+-+-+-+-+-+-+-+-+-+-+-+-+-+
|            Reserved(MBZ)                | Assoc Label Multipath Length |
+-+-+-+-+-+-+-+-+-+-+-+-+-+-+-+-+-+-+-+-+-+-+-+-+-+-+-+-+-+-+-+-+
~                                                                ~
|               (Associated Label Multipath Information)         |
~                                                                ~
+-+-+-+-+-+-+-+-+-+-+-+-+-+-+-+-+-+-+-+-+-+-+-+-+-+-+-+-+-+-+-+-+
```

The IP multipath information section (or more simply IP section) describes a set of IP addresses and includes an IP multipath type 310, an IP multipath length 315, and IP multipath information 320. IP multipath information section reuses multipath information described in RFC 4379. IP multipath type 310 includes a value from the existing set of types {0, 2, 4, and 8} used for IP multipath information. IP multipath length 315 is the length (in octets) of IP multipath information 320. IP multipath information 320 includes encoded multipath data of the set of IP addresses, according to the multipath type (e.g., {0} empty, {2} IP addresses, {4} low/high address pairs, or {8} bit-masked IP address set). Sections that include MBZ are "Must Be Zero" sections.

The label (LB) multipath information section (or more simply LB section) describes a set of labels and includes an LB multipath type 330, an LB multipath length 335, and label multipath information 340. LB multipath information section reuses multipath information described in RFC 4379. LB multipath type 330 includes a value from the existing set of types {0 or 9} used for label multipath information. LB multipath length 335 is the length (in octets) of LB multipath information 340. LB multipath information 340 includes encoded multipath data of the set of labels, according to the multipath type (e.g., {0} empty or {9} bit-masked label set).

The associated label multipath information section (or more simply associated label section) describes an additional set of labels that are associated with either the set of IP addresses in IP multipath information 320 or with the set of labels in LB multipath information 340. The associated label multipath information section includes an associated label multipath length 350 and associated label multipath information 355. Associated label multipath length 350 is a 16 bit field and indicates length (in octets) of associated label multipath information 350. Associated label multipath information 350 is a list of labels, with each label described in 24 bits. Each label described in the LB section maps to at least one specific IP address in the IP section or to a specific label in the LB section. For example, if three IP addresses are specified in IP multipath information 320, then three labels are described in associated label multipath information 355. The first label maps to the lowest IP address specified, the second label maps to the second lowest IP address specified, and the third label maps to the third lowest IP address specified.

When the initiator (e.g., that performs IP based load balancing) receives associated label multipath information (in an echo reply), the initiator can include such labels in an LB section of an outgoing multipath type 10 element (as well as any received IP addresses in an IP section of the multipath type 10 element) that is included in an echo request. The initiator LSR sends the echo request to the next hop LSR and is able to interrogate the next hop LSR about its downstream transit LSRs that map to the LB multipath information. The initiator is now able to obtain further multipath information that it previously had been unable to obtain (e.g., previously, the next hop LSR that implements label based load balancing would have sent an empty multipath information back to the initiator).

New DS flags are also defined for use in DSMAP/DDMAP TLVs. The new DS flags are a label based load balance indicator 370 (or simply L) and an ELI/EL imposer indicator 375 (or simply E). Flag L indicates the load balancing technique implemented by a responding LSR. Flag L indicates that a responding LSR performs label based load balancing with L=1 (or yes/true) and indicates IP based load balancing with L=0 (or no/false). Flag E indicates that the responding LSR imposes entropy labels (EL) and entropy label indicators (ELI) to forward a packet with E=1 (or yes/true), and indicates that the responding LSR does not impose ELI/EL with E=0 (or no/false). The responding LSR sets the L and E flags in an echo reply message to inform the initiator of the load balancing technique used by the responding LSR. The initiator does not set the L and E flags in echo request messages, which remain initialized or set to zero in an echo request message. The L and E flags in a received echo request message are also ignored by the responding LSR. The new DS flags are illustrated below.

TABLE 3

New DS Flags

```
 0 1 2 3 4 5 6 7
+-+-+-+-+-+-+-+-+
|   MBZ   |L|E|I|N|
+-+-+-+-+-+-+-+-+
```

The L and E flags result in four load balancing states of a responding LSR, illustrated below.

TABLE 4

| Load balancing states | |
|---|---|
| {L = 0, E = 0} | Responding LSR load balances based on IP and does not impose ELI/EL. |
| {L = 0, E = 1} | Responding LSR load balances based on IP and imposes ELI/EL. |
| {L = 1, E = 0} | LSR load balances based on label and does not impose ELI/EL. |
| {L = 1, E = 1} | LSR load balances based on label and imposes ELI/EL. |

Although not shown, EL_LSP, which is a Boolean value, is maintained by the initiating LSR. EL_LSP controls when the initiator should send multipath information type 10 in subsequent echo request messages (or echo requests that include non-zero multipath information). EL_LSP generally indicates whether the LSP being tested includes an LSP segment that implements ELI/EI. When the initiator LSR generates an echo request message with DSMAP/DDMAP with non-zero multipath information, initiator LSR consults EL_LSP to determine the multipath information type to use. An EL_LSP value of one or true indicates multipath information type 10 should be sent. An EL_LSP value of zero or false indicates that the initiator should send the appropriate multipath information type according to RFC 4379 and/or RFC 6424. The initiator LSR initializes EL_LSP to zero (false) if the initiator does not impose ELI/EL, and initializes EL_LSP to one (true) if the initiator imposes ELI/EL. The initiator LSR also uses the new DS flags received in an echo reply message to adjust the EL_LSP variable. If the initiator receives an echo reply message with DS flag values {L=0, E=1} (and the echo reply includes verified contents, discussed below in connection with FIG. 4A-4D), the initiator LSR sets EL_LSP to one (yes/true).

Accordingly, a multipath type 10 element can include different information when carried by an echo request message or an echo response message. In an echo request message from an initiator, the multipath type 10 element includes both the IP section and the LB section, while associated label multipath information 350 is omitted (or NULL) with associated label multipath length 350 of 0. Flags L and E are both set to zero in the echo request and are ignored by the receiving LSR. In an echo reply message sent by a transit LSR that imposes ELI/EL labels, the multipath type 10 element includes either the IP section or the LB section, as well as the associated label section that is associated with the included IP section or LB section. The responding LSR can populate zero or more sections of multipath type 10 element and can set L and E flags in the echo reply, depending on the load balance technique used by the responding LSR, whether the responding LSR imposes ELI/EL labels, and whether the EL label is newly imposed or carried over from a previous EL based LSP.

Usage Case 1

FIG. 4A-4D are block diagrams illustrating example message exchanges during an example connectivity test implementing the present disclosure in the LSP illustrated in FIG. 1. In one embodiment, FIG. 4A-4D illustrate how the present disclosure provides a solution for the second scenario mentioned above in connection to FIG. 1, where two or more LSP segments are stitched together with at least one LSP segment implementing ELI/EL. For example, an initiator (such as LSR 1 120(1) of FIG. 1) may send existing multipath information to a transit LSR (such as LSR 4 120(4) of FIG. 1) that is a stitching point for two LSP segments, such as a first LSP segment (e.g., LSP segment 110(1) of FIG. 1) that does not implement ELI/EL (and implements IP load balancing) and a second LSP segment (e.g., LSP segment 110(2) of FIG. 1) that implements ELI/EL (and performs label based load balancing).

As part of the first LSP segment, LSR 4 performs IP based load balancing (L=0). As part of the second LSP segment, LSR 4 imposes ELI/EL labels for packets that will enter the second LSP segment (E=1). LSR 4's downstream LSRs (e.g., LSR 6 120(6) of FIG. 1), which are part of the second LSP segment that implements ELI/EL, perform label based load balancing (L=1). In such a scenario, the initiator LSR 1 can continue to discover and exercise specific ECMP paths in the second LSP segment if LSR 4 responds with both a set of IP addresses and a set of associated ELs that correspond to, or map to, each IP address in the set of IP addresses. LSR 4 is able to respond in such a way using multipath type 10 element, which includes an IP section and an associated label section.

As illustrated in FIG. 4A, LSR 1 initiates a connectivity test by sending an echo request 410(1) to the next hop LSR along the LSP being tested (which spans from LSR 1 to LSR N of FIG. 1), according to the procedures described in RFC 4379 and/or RFC 6424. In this example, LSR 1 has load balancing state of {L=0, E=0}, indicating that LSR 1 performs IP based load balancing and does not impose ELI/EL. Regardless of LSR 1's load balancing state, LSR 1 does not set the DS flags in the echo request to reflect its own load balancing state (instead leaving them set to 0). LSR 1 also initiates EL_LSP 415 to 0 (since LSR 1 does not impose ELI/EL). LSR 2 receives the echo request (and ignores the DS flags) and responds with an echo reply 420(1) that includes a DSMAP or DDMAP element 430(1) with (IP) multipath information 445(3) of type 440(1) (and appropriate multipath length) for each of its downstream LSRs 435(1), according to the procedures described in RFC 4379 and/or RFC 6424. LSR 2 also sets DS flags L and E of the DSMAP/DDMAP to reflect LSR 2's load balancing state, which in this example is {L=0, E=0}.

Figure 4B:
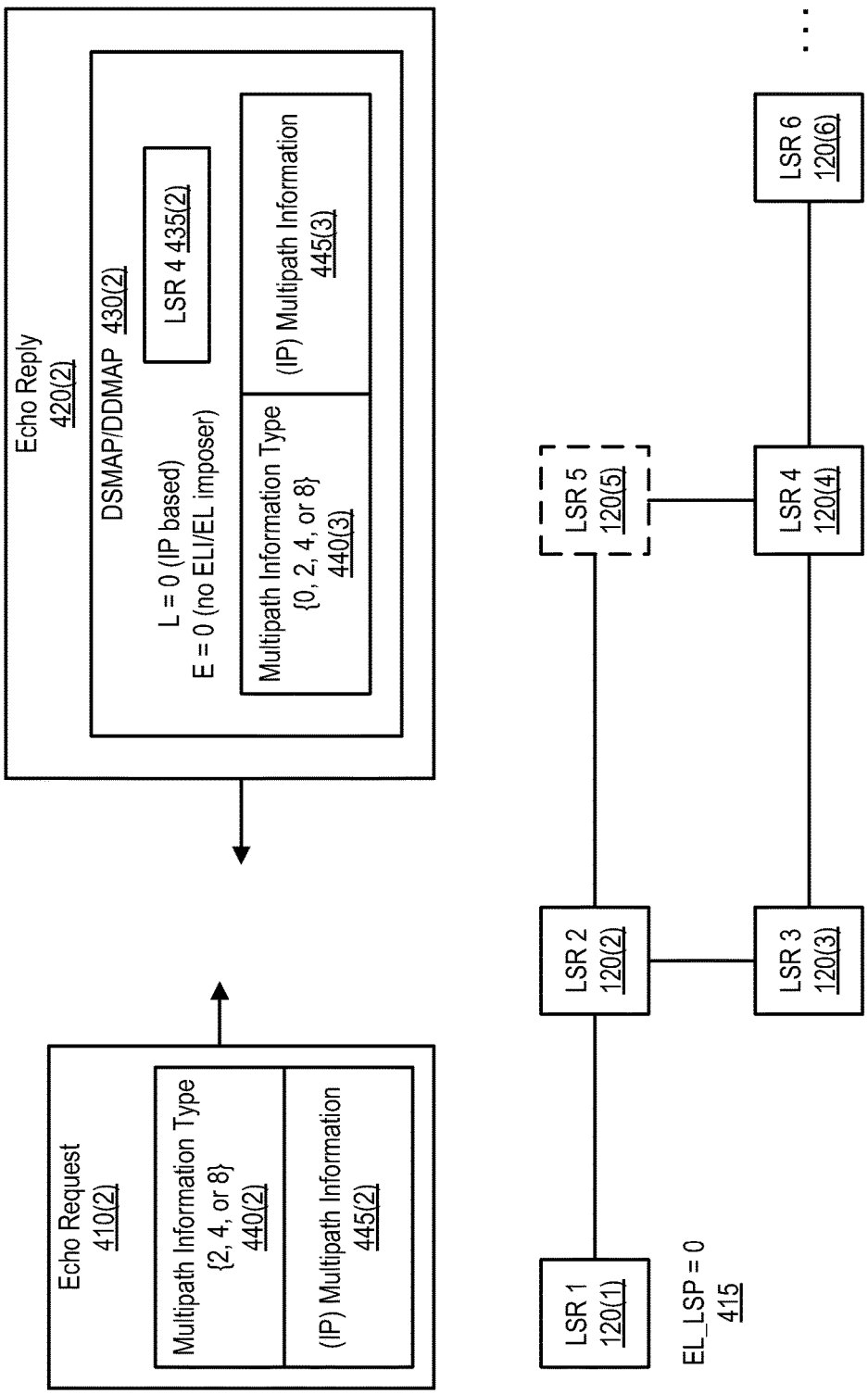

FIG. 4B illustrates a subsequent iteration of the connectivity test, where LSR 1 processes the received multipath information from LSR 2's echo reply 420(1) (e.g., verifies that the contents of the echo request are consistent with the values of new DS flags L and E, and if so, adds the multipath information to the multipath database) and copies the multipath information into a subsequent echo request 410(2) that is sent to next hop LSR 5, according to the procedures described in RFC 4379 and/or RFC 6424. LSR 5 receives the echo request and responds with an echo reply 420(2), according to the procedures described in RFC 4379 and/or RFC 6424. LSR 5 also sets DS flags L and E of DSMAP/DDMAP 430(2) to reflect LSR 5's load balancing state, which in this example is {L=0, E=0}.

Figure 4C:
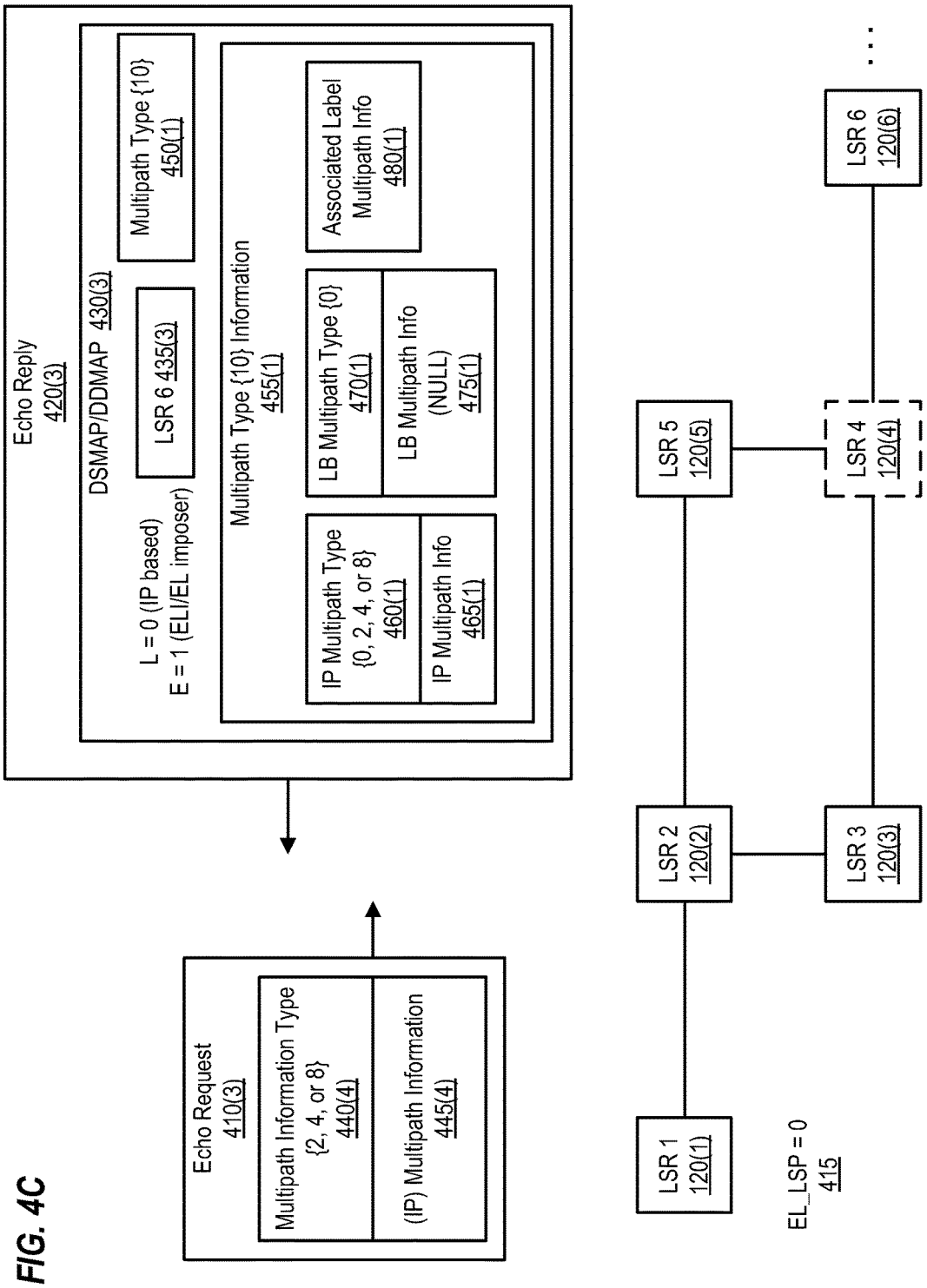

FIG. 4C illustrates a subsequent iteration of the connectivity test, where LSR 1 processes the received multipath information from LSR 5's echo reply 420(2) and generates a subsequent echo request 410(3) for next hop LSR 4, according to the procedures described in RFC 4379 and/or RFC 6424. LSR 4 is a stitching point for LSP segments 1 and 2, where LSP segment 2 implements ELI/EL. LSR 4 sets DS flags of L and E in DSMAP/DDMAP 430(3) to reflect LSR 4's load balancing state, which in this example is {L=0, E=1}, indicating that LSR 4 performs IP based load balancing and imposes ELI/EL. Since LSR 4 is aware that LSR 4 imposes ELI/EL for packets entering LSP segment 2, LSR 4 is not only configured to return IP multipath information (determined by LSR 4 to map to the incoming multipath information, which are IP addresses in this example) to the initiator, but is also configured to also report any entropy labels that map to the returning IP multipath information. To do this, LSR 4 includes multipath type 10 450(1) and multipath type 10 information 455(1) (and appropriate multipath length) in DSMAP/DDMAP 430(3). Multipath information 455(1) in turn includes the appropriate IP multipath type 460(1) and information 465(1) determined by LSR 4 (as well as the appropriate multipath length), and also includes associated label multipath information 480(1) (and appropriate length) that includes the set of entropy labels used by LSR 4 that map to the IP addresses included in multipath information 465(1). Since LSR 4 performs IP based load balancing, LSR 4 omits label multipath information in multipath information 455(1) by setting LB multipath type 470(1) (and LB multipath length) to zero and setting LB multipath information 475(1) to NULL value.

Figure 4D:
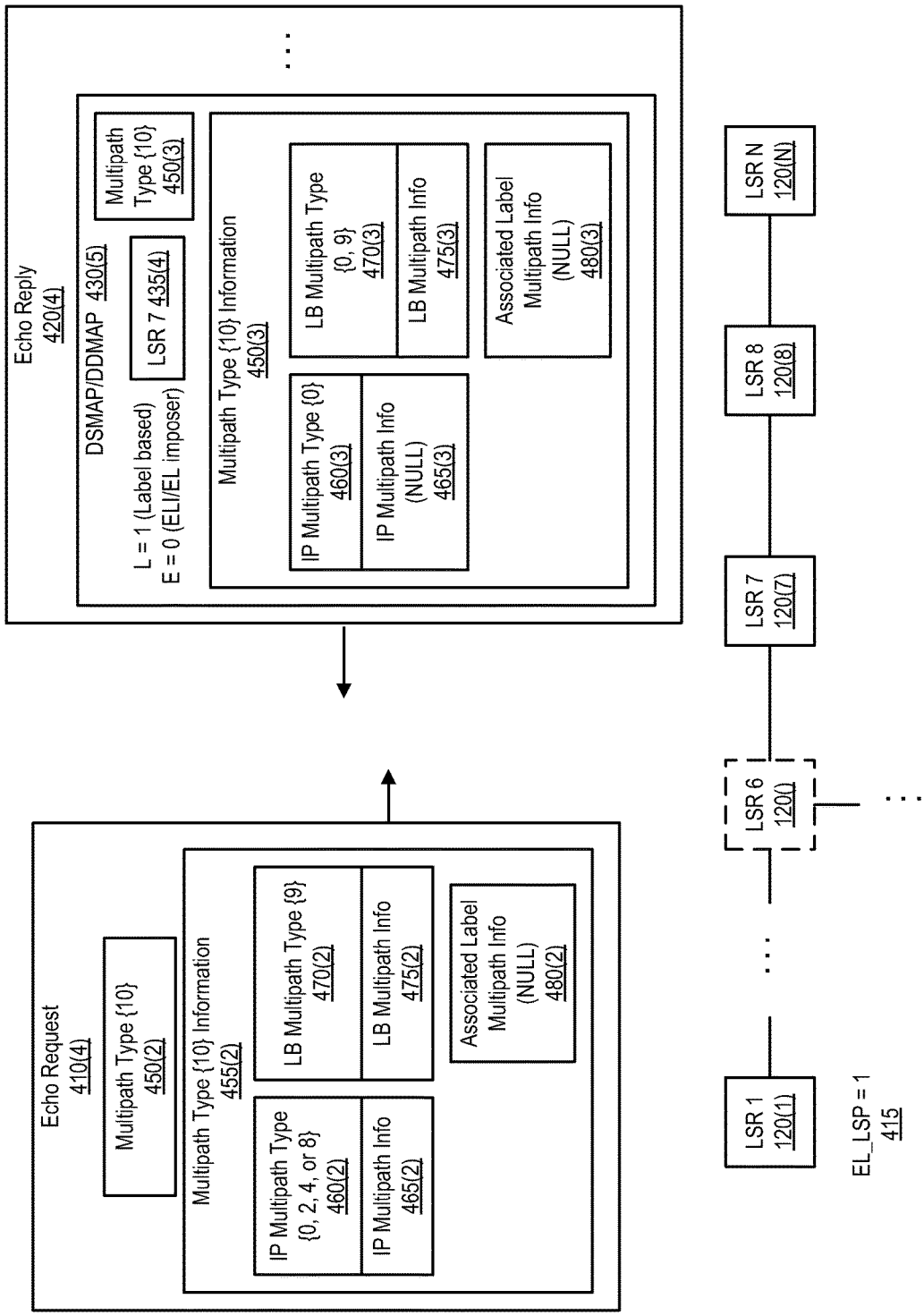

FIG. 4D illustrates a subsequent iteration of the connectivity test, where LSR 1 processes the received multipath information from LSR 4's echo reply 420(3). LSR 1 is now able to transition its interrogations into the second LSP segment that implements ELI/EL by using a multipath type 10 element to ask the next hop LSR for any downstream multipath information that maps to the entropy labels provided by LSR 4. LSR 1 generates a subsequent echo request 410(4) that copies the IP multipath information of the received multipath information type 10 element into IP multipath information 465(2) of the outgoing multipath type 10 information 455(2), and sets the appropriate IP multipath type 460(1) (and appropriate IP multipath length). LSR 1 also copies the associated label information of the received multipath information type 10 element into the outgoing LB multipath information 475(2), and sets the appropriate LB multipath type 470(2) (and appropriate LB multipath length). LSR 1 also omits the associated label section by setting associated label multipath information 480(2) to NULL (and sets the associated label length to zero). When LSR 1 receives a load balancing state of {L=0, E=1}, LSR 1 (which has state {L=0, E=0}) recognizes that a change has occurred in the LSP (e.g., an EL is now imposed), indicating that multipath type 10 elements are now needed to interrogate LSRs in the next LSP segment. LSR 1 updates EL_LSP 415 to one. Since EL_LSP is set to one, any echo requests sent by LSR 1 after the present echo request 410(4) will include multipath information type 10.

LSR 6 receives the echo request and validates the multipath information type 10 (e.g., verify that the multipath information type 10 includes an IP section and an LB section, but omits an associated label section), and responds with echo reply 420(4). LSR 6 performs label based load balancing and uses the received label multipath information to determine returning label multipath information 475(3). LSR 6 sets DS flags of L and E in DSMAP/DDMAP 430(3) to reflect LSR 6's load balancing state, which in this example is {L=1, E=0}, indicating that LSR 6 performs label based load balancing and does not impose ELI/EL. Since LSR 6 performs label based load balancing, LSR 6 omits IP multipath information in multipath information 450(3) by setting IP multipath type 460(3) (and IP multipath length) to zero and setting IP multipath information 465(3) to NULL value. Finally, since LSR 6 does not impose (or swap) an EL on packets destined for a downstream LSR (but instead uses the EL that was imposed by LSR 4) and is not aware of any additional label set that would map to the received set of entropy labels, LSR 6 omits associated label multipath information 480(3) from the multipath type 10 information 455(1). The message exchange would continue in this manner to complete the connectivity test.

Usage Case 2

In one embodiment, FIG. 4A-4D also illustrate how the present disclosure provides a solution for the first scenario mentioned above in connection to FIG. 1, where one or more transit LSRs are located along an LSP that does not implement ELI/EL (and implements IP load balancing), but perform label based load balancing. The connectivity test proceeds in a manner similar to that illustrated in FIGS. 4A and 4B (described above in connection with usage case 1). In FIG. 4C, LSR 4 (which may be a transit LSR on an LSP that does not implement ELI/EL, or a stitching point between a first LSP segment that does not implement ELI/EL and a second LSP segment that implements ELI/EL) is not aware of any label set that maps to incoming IP multipath information. For example, LSR 4 may have a load balancing state of {L=1, E=1}, indicating that LSR 4 performs label based load balancing and imposes ELI/EL. In such a scenario, LSR 4's echo reply 420(3) illustrated in FIG. 4C would include empty or zero label multipath information and no associated label multipath information (e.g., would return multipath information type 0 instead of multipath information type 10) in response to the received set of IP addresses in echo request 410(3). However, LSR 4 also sets new DS flags L and E to indicate to LSR 1 that LSR 4 is unable to determine the multipath information due to implementing an incompatible load balancing algorithm, rather than the LSP being broken due to none of the set of IP addresses mapping to a downstream LSR. LSR 1 may have lost the ability to exercise specific ECMP paths on the LSP, but is now aware of why LSR 1 lost such ability.

Usage Case 3

In one embodiment, FIG. 4A-4D also illustrate how the present disclosure provides a solution for the second scenario mentioned above in connection to FIG. 1 for another situation where two or more LSP segments are stitched together with at least one LSP segment implementing ELI/EL. For example, an initiator (e.g., LSR 1 110(1) of FIG. 1) may send existing multipath information to a transit LSR (e.g., LSR 4 120(4) of FIG. 1) that is a stitching point for two LSP segments, such as a first LSP segment (e.g., LSP segment 110(1) of FIG. 1) that implements ELI/EL and imposes one EL label, and a second LSP segment (e.g., LSP segment 110(2) of FIG. 1) that implements ELI/EL, but imposes a new EL label.

The connectivity test proceeds in a manner similar to that illustrated in FIGS. 4A, 4B, and 4C (described above in connection with usage case 1), with the following exceptions:

(1) LSR 1 has load balancing state {L=1, E=1}, indicating that LSR 1 performs label based load balancing and imposes ELI/EL (and does not set DS flags in echo request 410(1), which remain set to zero). Since LSR1 is an ELI/EL imposer, LSR 1 also sets EL_LSP to one. Since EL_LSP is set to one, any subsequent echo requests (including initial echo request 410(1)) sent by LSR will include multipath information type 10, which includes IP and label multipath information determined from LSR 1's forwarding and/or routing tables (where the IP and label multipath information are also added to the multipath database).

(2) LSR 2's echo reply 420(1) and LSR 5's echo reply 420(2) include DS flags L=1 and E=0 to reflect that LSR 2 and LSR 5 perform label based load balancing and do not impose ELI/EL (instead using the EL imposed by LSR 1). Echo replies 420(1) and 420(2) also include multipath information of type {9}.

(3) LSR 1's echo requests 410(2) and 410(3) include label multipath information of type 19). Since EL_LSP is set to one, the multipath information type 9 is included in a multipath type 10 element.

In FIG. 4C, as part of the first LSP segment, LSR 4 performs label based load balancing using the (carried-over) EL of the first LSP segment that was imposed by LSR 1. As part of the second LSP segment, LSR 4 imposes a new EL for packets that will enter the second LSP segment, where LSR 4's downstream LSRs on the second LSP segment perform label based load balancing using the new EL. In such a scenario, the initiator LSR 1 can continue to discover and exercise specific ECMP paths in the second LSP segment if LSR 4 responds with both a set of labels and a set of associated ELs that correspond to, or map to, each label in the set of labels. LSR 4 is able to respond in such a way using multipath type 10 element, which includes an LB section and an associated label section. LSR 4's echo reply 420(3) includes DS flags L=1 and E=1 to reflect LSR's load balancing state. LSR 6 also returns label multipath information and associated label multipath information 480(3) that maps to the returned label multipath information 475(3).

Usage Case 4

In one embodiment, FIG. 4A-4D also illustrate how the present disclosure provides a solution for the first scenario mentioned above in connection to FIG. 1, where one or more transit LSRs are located along an LSP that implements ELI/EL (and implements label load balancing), but perform IP based load balancing. The connectivity test proceeds in a manner similar to that illustrated in FIGS. 4A, 4B, and 4C (described above in connection with usage case 1), with the following exceptions:

(1) LSR 1 has load balancing state {L=1, E=1}, indicating that LSR 1 performs label based load balancing and imposes ELI/EL (and does not set DS flags in echo request 410(1), which remain set to zero). Since LSR1 is an ELI/EL imposer, LSR 1 also sets EL_LSP to one. Since EL_LSP is set to one, any subsequent echo requests (including initial echo request 410(1)) sent by LSR will include multipath information type 10, which includes IP and label multipath information determined from LSR 1's forwarding and/or routing tables (where the IP and label multipath information are also added to the multipath database).

(2) LSR 2's echo reply 420(1) and LSR 5's echo reply 420(2) include DS flags L=1 and E=0 to reflect that LSR 2 and LSR 5 perform label based load balancing and do not impose ELI/EL (instead using the EL imposed by LSR 1). Echo replies 420(1) and 420(2) also include multipath information of type {9}.

(3) LSR 1's echo requests 410(2) and 410(3) include label multipath information of type {9}. Since EL_LSP is set to one, the multipath information type 9 is included in a multipath type 10 element.

In FIG. 4C, LSR 4 (which may be a transit LSR on an LSP that implements ELI/EL, or a stitching point between a first LSP segment that implements ELI/EL and a second LSP segment that does not implement ELI/EL) is not aware of any IP address set that maps to incoming label multipath information. For example, LSR 4 may have a load balancing state of {L=0, E=0}, indicating that LSR 4 performs IP based load balancing and does not impose ELI/EL. In such a scenario, LSR 4's echo reply 420(3) illustrated in FIG. 4C would not include multipath information type 10, but instead would include empty or zero IP multipath information and no associated label information in response to the received set of label addresses in echo request 410(3) (e.g., would return multipath information type 0 instead of multipath information type 10). However, LSR 4 also sets new DS flags L and E to indicate to LSR 1 that LSR 4 is unable to determine the multipath information due to implementing an incompatible load balancing algorithm, rather than the LSP being broken due to none of the set of labels mapping to a downstream LSR. LSR 1 may have lost the ability to exercise specific ECMP paths on the LSP, but is now aware of why LSR 1 lost such ability.

The present disclosure also extends aspects of the procedures discussed in RFC 4379 and/or RFC 6424, with regard to multipath type 9, an entropy label FEC, and FAT (Flow-Aware Transport) pseudowires.

Multipath Type 9

RFC4379 defined multipath type {9} for tracing of LSPs where label based load-balancing is used. However, as pointed out in RFC 6790, the procedures of RFC 4379 for using multipath information type {9} are incomplete. First, the specific location of the label was not defined. It is conventionally assumed that the presence of multipath type {9} meant the responder should act as if the payload of the received packet were non-IP and that the bottom-of-stack label should be replaced by the values indicated by multipath type {9} to determine their respective out-going interfaces. Further, with the introduction of RFC 6790, entropy labels may now appear anywhere in a label stack.

The present disclosure defines to which labels multipath type {9} can apply. Additionally, procedures are defined for tracing pseudowires and flow-aware transport pseudowires. These procedures pertain to the use of multipath information type {9} as well as type {10}.

A new FEC-Stack sub-TLV, or entropy label FEC, is also herein defined to indicate an entropy label, also referred to as EL-FEC. Multipath type {9} applies exclusively to EL-FEC. Any echo request or echo response containing a DDMAP or DSMAP with multipath type {9} now includes an EL-FEC at the bottom of the FEC-Stack. When a responder receives an echo request message containing a FEC-Stack with an EL-FEC at the bottom of the FEC stack and is not preceded by an entropy label, the responder behaves (for load balancing purposes) as if the first word of the message were a Pseudowire Control Word.

In order to trace a non-FAT pseudowire (PW), an EL-FEC is included instead of the appropriate PW-FEC in the FEC-Stack. Tracing in this way will cause compliant LSRs to return the proper outgoing interface. Note that this procedure only traces to the end of the MPLS transport LSP (e.g. LDP and/or RSVP). To actually verify the PW-FEC or (in the case of a multi-segment pseudowire) to determine the next pseudowire label value, the initiator repeats that step of the trace, (i.e., repeating the TTL value used) but with the FEC-Stack modified to contain the appropriate PW-FEC. In order to trace a FAT pseudowire, the initiator includes an EL-FEC at the bottom of the FEC-Stack and pushes the appropriate PW-FEC onto the FEC-Stack.

FAT MS-PW Stitching LSR

Multi-segment pseudowire (MS-PW) stitching LSR that xconnects flow-aware pseudowires behaves in one of two ways:

(1) Load balances on previous flow label, and carries over same flow label. For this case, stitching LSR is to behave as procedures described for a responder having load balancing state {L=1, E=0}.

(2) Load balances on previous flow label, and replaces flow label with newly computed. For this case, stitching LSR is to behave as procedures described for a responder having load balancing state {L=1, E=1}.

Entropy Label FEC

Entropy Label Indicator (ELI) is a reserved label that has no explicit FEC associated, and has label value 7 assigned from the reserved range. Use Nil FEC as Target FEC Stack sub-TLV to account for ELI in a Target FEC Stack TLV.

Entropy Label (EL) is a special purpose label with label value being discretionary (i.e. label value may not be from the reserved range). For LSP verification mechanics to perform its purpose, it is necessary for a Target FEC Stack sub-TLV to clearly describe EL, particularly in the scenario where label stack does not carry ELI (ex: FAT-PW described in RFC 6391). Therefore, the present disclosure defines an EL-FEC to allow a Target FEC Stack sub-TLV to be added to the Target FEC Stack to account for EL.

The Length is 4. Labels are 20-bit values treated as numbers, as illustrated below.

TABLE 5

Label format

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                Label                  |           MBZ         |
+-+-+-+-+-+-+-+-+-+-+-+-+-+-+-+-+-+-+-+-+-+-+-+-+-+-+-+-+-+-+-+-+
```

Label is the actual label value inserted in the label stack; the MBZ fields are zero when sent and ignored on receipt.

Figure 5A:
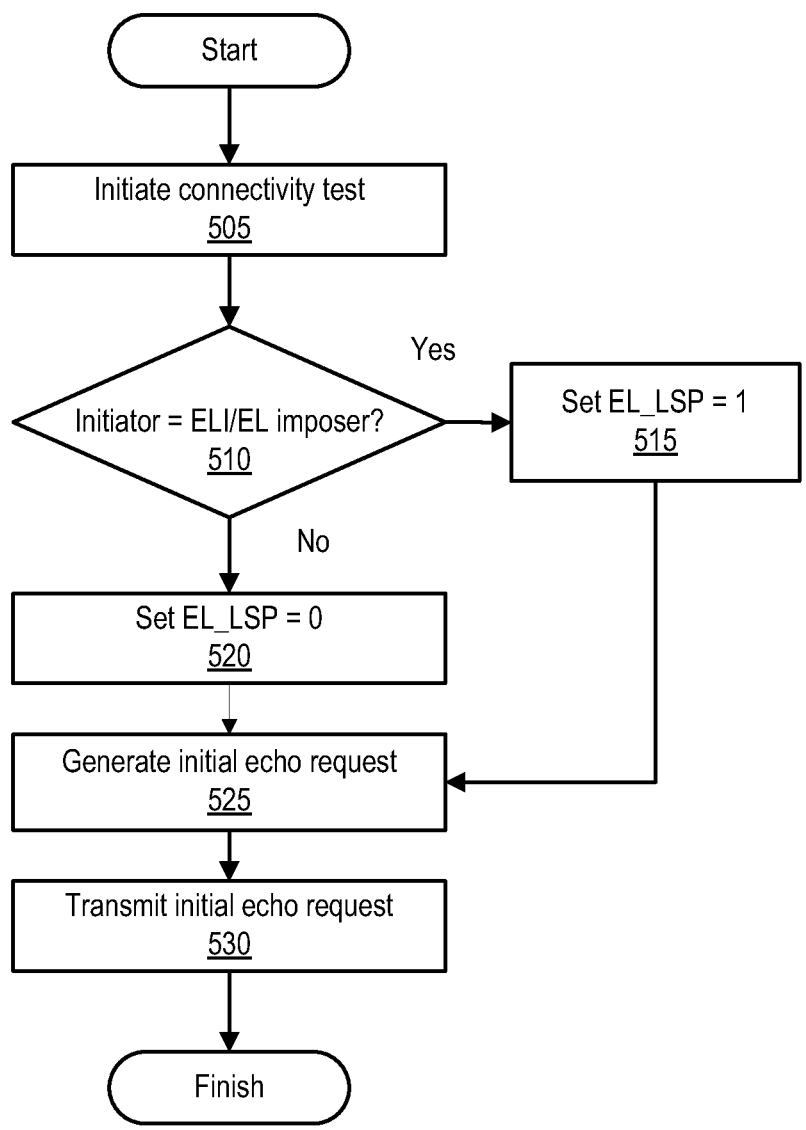
FIGS. 5A and 5B are flowcharts illustrating operations of example message processing implemented by an initiator node, according to one embodiment.
Figure 5B:
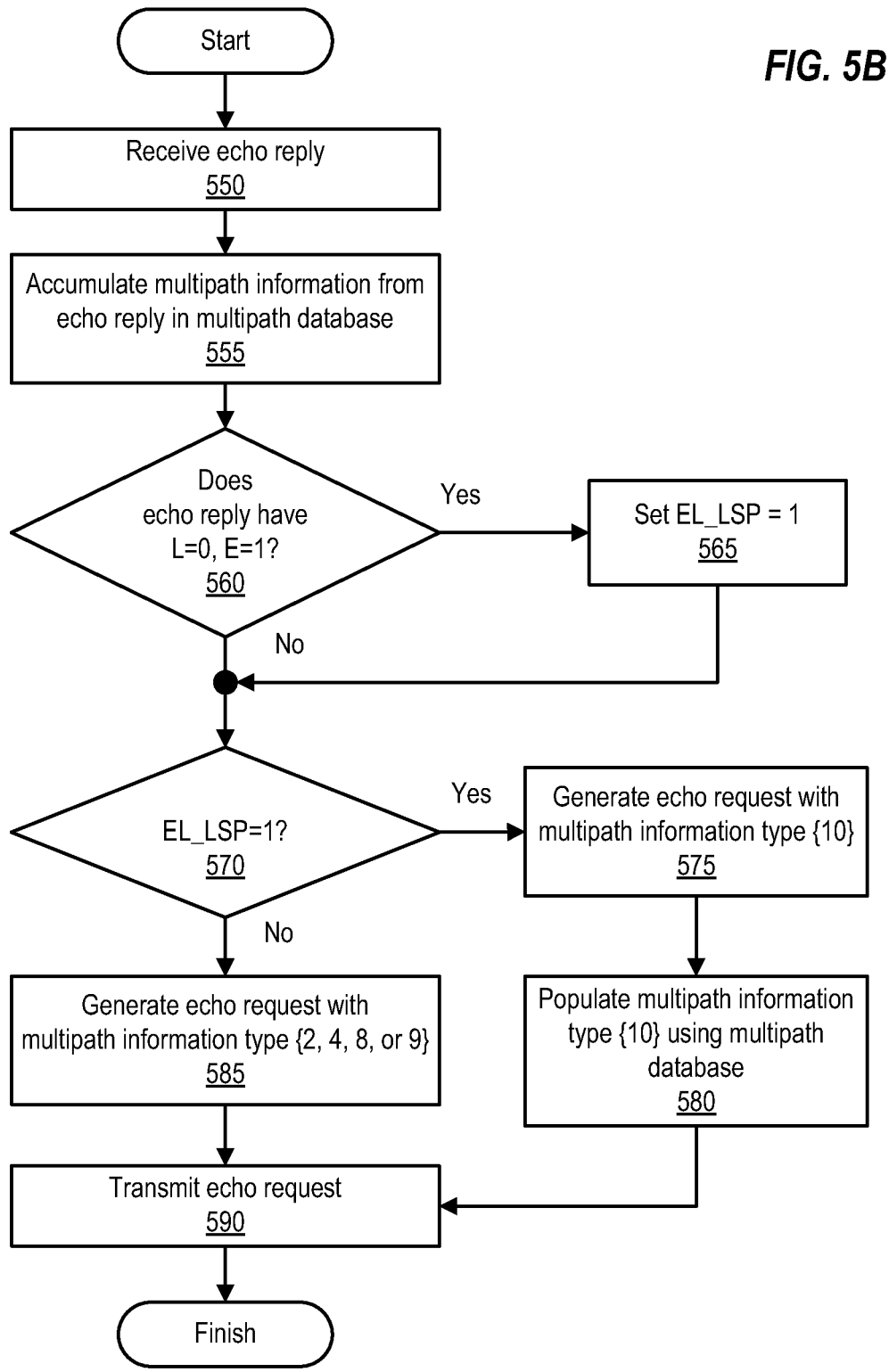

FIGS. 5A and 5B are flowcharts illustrating operations of example message processing implemented by an initiator node or LSR. The process illustrated in FIGS. 5A and 5B are performed by an initiator logic module 210 of multipath information logic module 140 implemented on an initiator LSR. The initiator logic module is configured to communicate with a connectivity test logic module 130, also implemented on the initiator LSR. The initiator logic module and connectivity test logic module are configured to cooperatively implement the procedures described in RFC 4379 and RFC 6424, as extended by the present disclosure.

The process illustrated in FIG. 5A starts at operation 505, where the initiator logic module detects that a connectivity test is initiated (e.g., by receiving a command or message at a port of the initiator LSR, which indicates to the initiator logic module that the connectivity test should be started). The process continues to operation 510, where the initiator logic module determines whether the initiator LSR imposes ELI/EL. If the initiator LSR imposes ELI/EL, the process continues to operation 515, where the initiator logic module initializes EL_LSP to one or true. The process then continues to operation 525, described below.

Returning to operation 510, if the initiator LSR does not impose ELI/EL, the process continues to operation 520, where the initiator logic module initializes EL_LSP to zero or false. The process continues to operation 525, where the initiator logic module generates an initial echo request message. The initiator logic module includes an echo request generator that is configured to generate an echo request message in cooperation with connectivity test logic module, according to RFC 4379 and/or RFC 6424. If EL_LSP is equal to zero, the echo request message includes multipath information type {2, 4, 8 or 9}, according to RFC 4379 and/or RFC6424. If EL_LSP is equal to one, the echo request message includes a multipath type 10 element, which includes IP and label multipath information determined from one or more forwarding and/or routing tables of the initiator LSR (which is also added to the multipath database). The multipath type 10 element omits the associated label section. The process continues to operation 530, where the echo request generator transmits the (generated) echo request message to the next hop LSR toward the egress LSR of the LSP being tested. The process then ends.

The process illustrated in FIG. 5B starts at operation 550, where an echo reply receiver of the initiator logic module detects that an echo reply message is received (e.g., received at a port of the initiator LSR and directed internally to the echo reply receiver). The echo reply receiver also verifies the contents of any multipath information in the echo reply (e.g., verifies that the contents of the multipath information are consistent with the values of new DS flags L and E), as well as performs any other verification/validation procedures described in RFC 4379 and/or RFC 6424 for multipath information types {0, 2, 4, 8, 9, or 10}. It is noted that for the following explanation of FIG. 5B, the multipath information included in the received echo reply is assumed to be non-zero (including a multipath type 10 element that has non-zero multipath information in at least one of the IP section and the LB section), indicating that the initiator LSR will generate and transmit an echo request containing non-zero multipath information. A received echo reply that includes multipath information that is zero (or empty or type 0) is discussed below in connection with Table 6.

The process continues to operation 555, where a multipath information accumulator of the initiator logic module accumulates or extracts the multipath information included in the echo reply message and adds the extracted multipath information to the multipath database. The process continues to operation 560, where the echo reply receiver determines whether the new DS flags in the received echo reply match a state of {L=0, E=1}. If the new DS flags in the received echo reply are {L=0, E=1}, the process continues to operation 565, where initiator logic module sets EL_LSP to one or true. The process continues to operation 570, described below.

Returning to operation 560, if the new DS flags do not indicate a state of {L=0, E=1}, the process continues to operation 570, where the initiator logic module determines whether the present value of EL_LSP is equal to one (or true). If EL_LSP does equal to one, the process continues to operation 575, where an echo request generator of the initiator logic module generates an echo request (in cooperation with connectivity test logic module) that includes a multipath type 10 element, using a multipath type 10 element generator. In another embodiment, the echo request generator generates multipath type 10 elements in response to receiving a multipath type 10 element in a received echo reply. The process continues to operation 580, where the multipath type 10 element generator populates the multipath type 10 element with appropriate multipath information determined from the multipath database maintained by the initiator LSR. The initiator LSR includes the appropriate multipath information in the echo request in order to interrogate a downstream transit LSR and obtain further multipath information. Both the IP section and the LB section are included in the multipath type 10 element, which respectively include multipath information of type {0, 2, 4, or 8} and {0 or 9}, while the associated label section is omitted (NULL with length of 0) from the multipath type 10 element. In an alternative embodiment of operations 575 and 580, the multipath type 10 element is generated and populated separately, and then inserted into the generated echo request message as part of a DSMAP/DDMAP. The process continues to operation 590, where the echo request generator transmits the echo request (that includes multipath type 10 element) to the next hop LSR toward the egress LSR. The process then ends.

Returning to operation 570, if EL_LSP does not equal to one, the process continues to operation 585, where the echo request generator generates an echo request (in cooperation with connectivity test logic module) including multipath information of types {2, 4, 8, or 9}, according to procedures described in RFC 4379 and RFC 6424. The process continues to operation 590, where the echo request generator transmits the echo request (that includes multipath information of type {2, 4, 8, or 9}) to the next hop LSR toward the egress LSR. The process then ends.

If an echo reply containing zero or empty multipath information is received, the initiator LSR may have lost the ability to exercise specific ECMP, as described in the following conditions. In this event, the initiator LSR may continue with "best effort."

TABLE 6

Scenarios where initiator may have lost
ability to exercise specific ECMP paths

Received echo reply contains empty multipath information.
Received echo reply contains {L = 0, E = <any>} DS flags,
but does not contain IP multipath information.
Received echo reply contains {L = 1, E = <any>} DS flags,
but does not contain label multipath information.
Received echo reply contains {L = <any>, E = 1} DS flags,
but does not contain associated label multipath information.
IP multipath information types {2, 4, 8} sent, and received
echo reply with {L = 1, E = 0} in DS flags.
Multipath information type {10} sent, and received echo
reply with multipath information type other than {10}.

Figure 6:
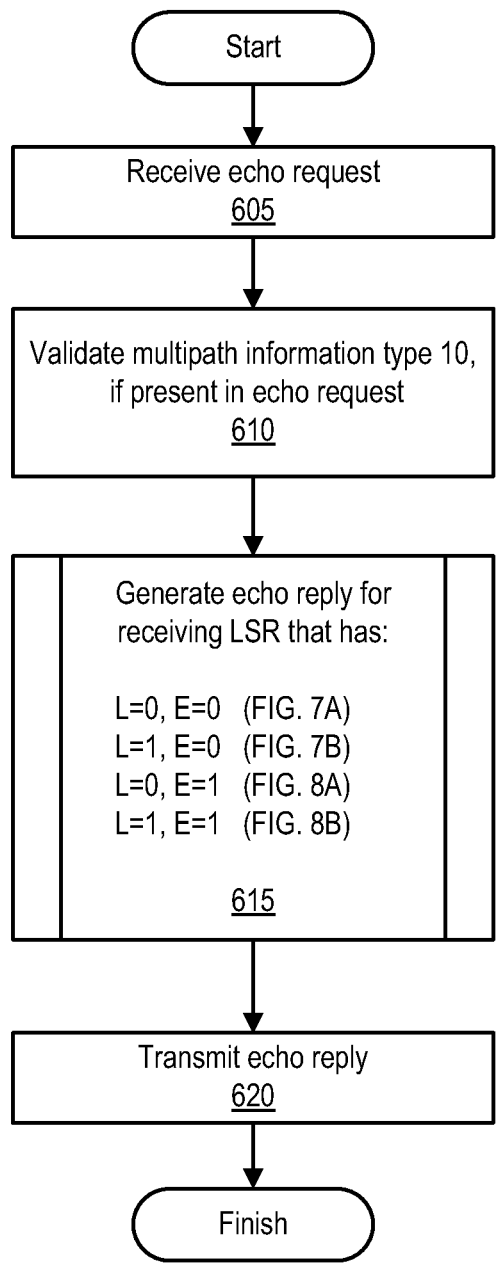
FIG. 6 is a flowchart illustrating operations of example message processing implemented by a responder node, according to one embodiment.

FIG. 6 is a flowchart illustrating operations of example message processing implemented by a responder node or LSR. The processes illustrated in FIG. 6 (and sub-processes illustrated in FIGS. 7A, 7B, 8A, 8B, 9A, and 9B) are performed by a responder logic module 250 of multipath information logic module 140 implemented on a transit LSR acting as a responder LSR. The responder logic module is configured to communicate with a connectivity test logic module 130, also implemented on the transit LSR. The responder logic module and connectivity test logic module are configured to cooperatively implement the procedures described in RFC 4379 and RFC 6424, as extended by the present disclosure.

The process illustrated in FIG. 6 starts at operation 605, where an echo request receiver of the responder logic module detects that an echo request message is received (e.g., received at a port of the responder LSR and directed internally to the echo request receiver). The process continues to operation 610, where the echo request receiver validates the multipath information type 10, if present in the echo reply. A multipath type 10 element is expected to include IP multipath information and label (LB) multipath information, but omit associated label multipath information. In response to any deviation from the expected form of a multipath type 10 element, the echo request receiver determines that the echo request is malformed (and thus not valid) and instructs echo reply generator to return code 1 (malformed echo request received) in an echo reply message, which is transmitted to the initiator. The echo request receiver also performs any other verification/validation procedures described in RFC 4379 and/or RFC 6424 for multipath information types {0, 2, 4, 8, 9, or 10}.

If the echo request is determined to be valid (and verified), the process continues to operation 615, where an echo reply generator of the responder logic module generates an echo reply in response to the received echo request. Depending on the load balancing state of the responder LSR, the echo reply generator may generate multipath information of types {0, 2, 4, 8, 9, or 10}, as further described below in connection with FIGS. 7A, 7B, 8A, and 8B. The echo reply generator also sets the new DS flags in the echo reply message to reflect the load balancing state of the responder LSR. The process continues to operation 620, where the echo reply generator transmits the echo reply towards the initiator. The process then ends.

Figure 7A:
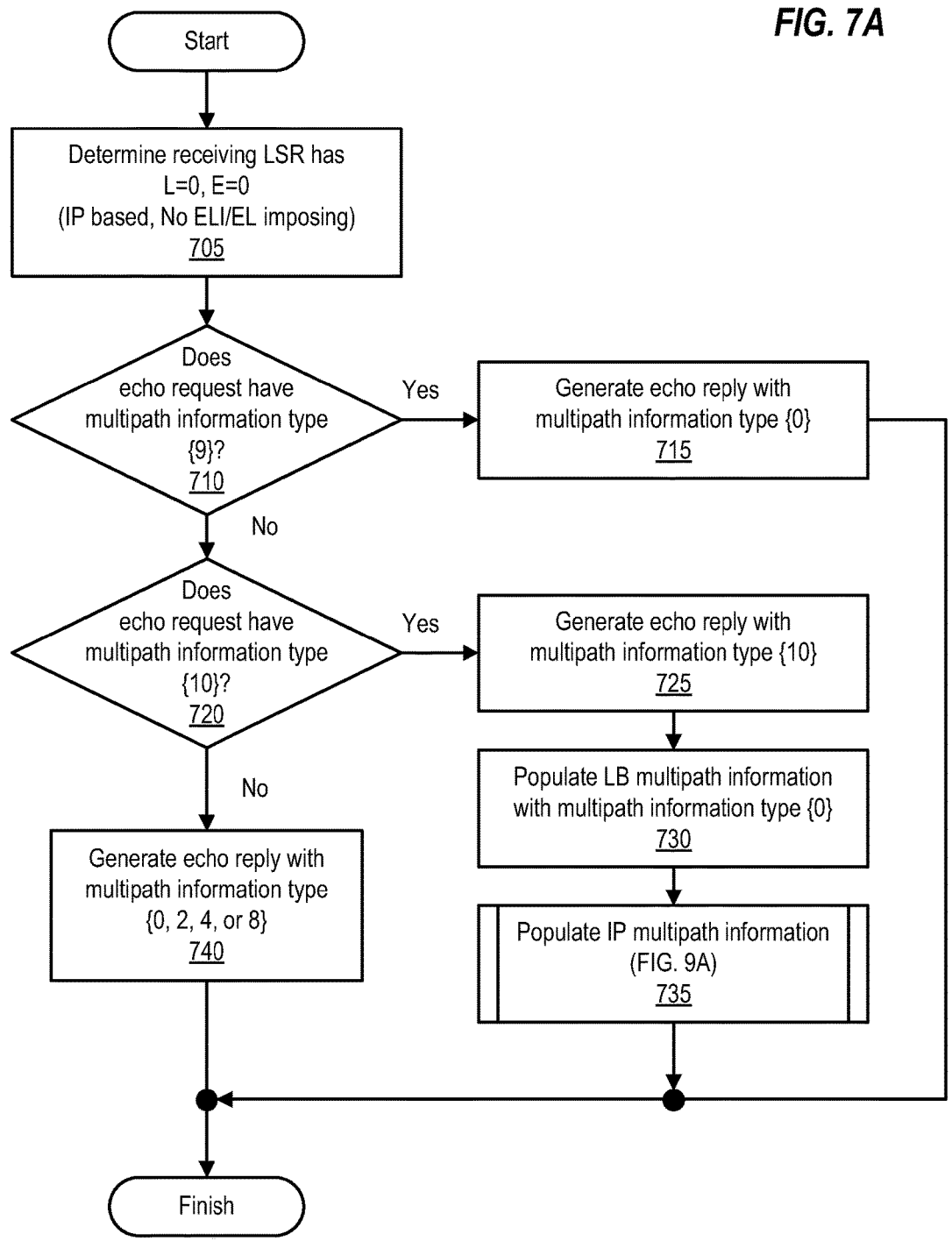
FIGS. 7A and 7B are flowcharts illustrating operations of example echo reply generation processes implemented by a responder node that does not impose entropy labels, according to one embodiment.
Figure 7B:
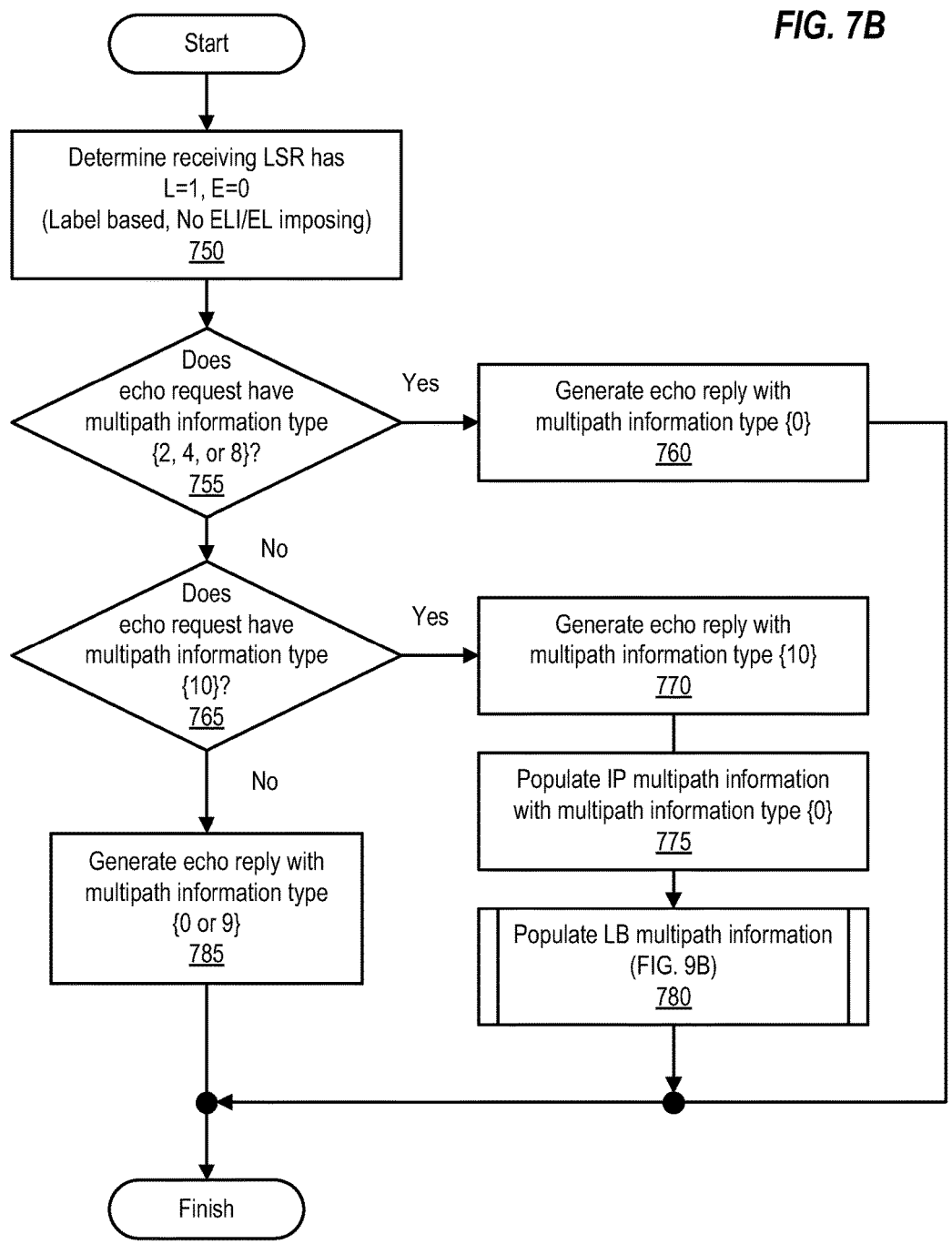

FIGS. 7A and 7B are flowcharts illustrating operations of example echo reply generation processes implemented by a responder node that does not impose entropy labels (or E=0). The process illustrated in FIG. 7A starts at operation 705, where the echo reply generator determines that the receiving LSR has load balancing state of {L=0, E=0}, which indicates that the receiving LSR performs IP based load balancing (L=0) and does not impose ELI/EL (E=0).

The process continues to operation 710, where the echo reply generator determines whether the echo request includes multipath information type 9. If so, the process continues to operation 715, where the echo reply generator generates an echo reply message with multipath information type 0, since the echo request includes a set of labels while the responding LSR implements IP based load balancing. In other words, the multipath type is set to multipath type 0, the multipath length is set to zero, and the multipath information is populated with NULL value. The process then ends.

Returning to operation 710, if the echo request does not include multipath information type 9, the process continues to operation 720, where the echo reply generator determines whether the echo request includes a multipath type 10 element. If so, the process continues to operation 725, where the echo reply generator generates an echo reply with a multipath type 10 element. The process continues to operation 730, where a multipath information populator (or simply populator) of the responder logic module populates label multipath information of the multipath type 10 element with multipath information type 0, since the echo request includes a set of labels while the responding LSR implements IP based load balancing. In other words, the LB multipath type is set to multipath type 0, the LB multipath length is set to zero, and the LB multipath information is populated with NULL value. The process continues to operation 735, where the populator populates IP multipath information of the multipath type 10 element, as further described below in connection with FIG. 9A. The process then ends.

Returning to operation 720, if the echo request does not include multipath information 10, the process continues to operation 740, where the echo reply generator generates an echo reply with multipath information type {0, 2, 4, or 8}, according to the procedures discussed in RFC 4379 and/or RFC 6424. The process then ends. In each of the echo reply messages generated in operations 715, 725, and 740, the echo reply generator sets the new DS flags to reflect the state of the receiving LSR, which is {L=0, E=0}.

The process illustrated in FIG. 7B starts at operation 750, the echo reply generator determines that the receiving LSR has load balancing state of {L=1, E=0}, which indicates that the receiving LSR performs label based load balancing (L=1) and does not impose ELI/EL (E=0). The process continues to operation 755, where the echo reply generator determines whether the echo request includes multipath information type (2, 4, or 8). If so, the process continues to operation 760, where the echo reply generator generates an echo reply with multipath information type 0, since the echo request includes a set of IP address while the responding LSR implements label based load balancing. In other words, the multipath type is set to multipath type 0, the multipath length is set to zero, and the multipath information is populated with NULL value. The process then ends.

Returning to operation 755, if the echo request does not include multipath type information {2, 4, or 8}, the process continues to operation 765, where the echo reply generator determines whether the echo request includes multipath information type 10. If so, the process continues to operation 770, where the echo reply generator generates an echo reply that includes a multipath type 10 element. The process continues to operation 775, where the populator populates IP multipath information of the multipath type 10 element with multipath information type 0, since the echo request includes a set of IP addresses while the responding LSR implements label based load balancing. In other words, the IP multipath type is set to multipath type 0, the IP multipath length is set to zero, and the IP multipath information is populated with NULL value. The process continues to operation 780, where the populator populates label multipath information of the multipath type 10 element, as further described below in connection with FIG. 9B. The process then ends.

Returning to operation 765, if the echo request does not include multipath information type 10, the process continues to operation 785, where the echo reply generator generates an echo reply with multipath information type {0 or 9}, according to the procedures discussed in RFC 4379 and/or RFC 6424, as extended by the present disclosure. The process then ends. In each of the echo reply messages generated in operations 760, 770, and 785, the echo reply generator sets the new DS flags to reflect the state of the receiving LSR, which is {L=1, E=0}.

Figure 8A:
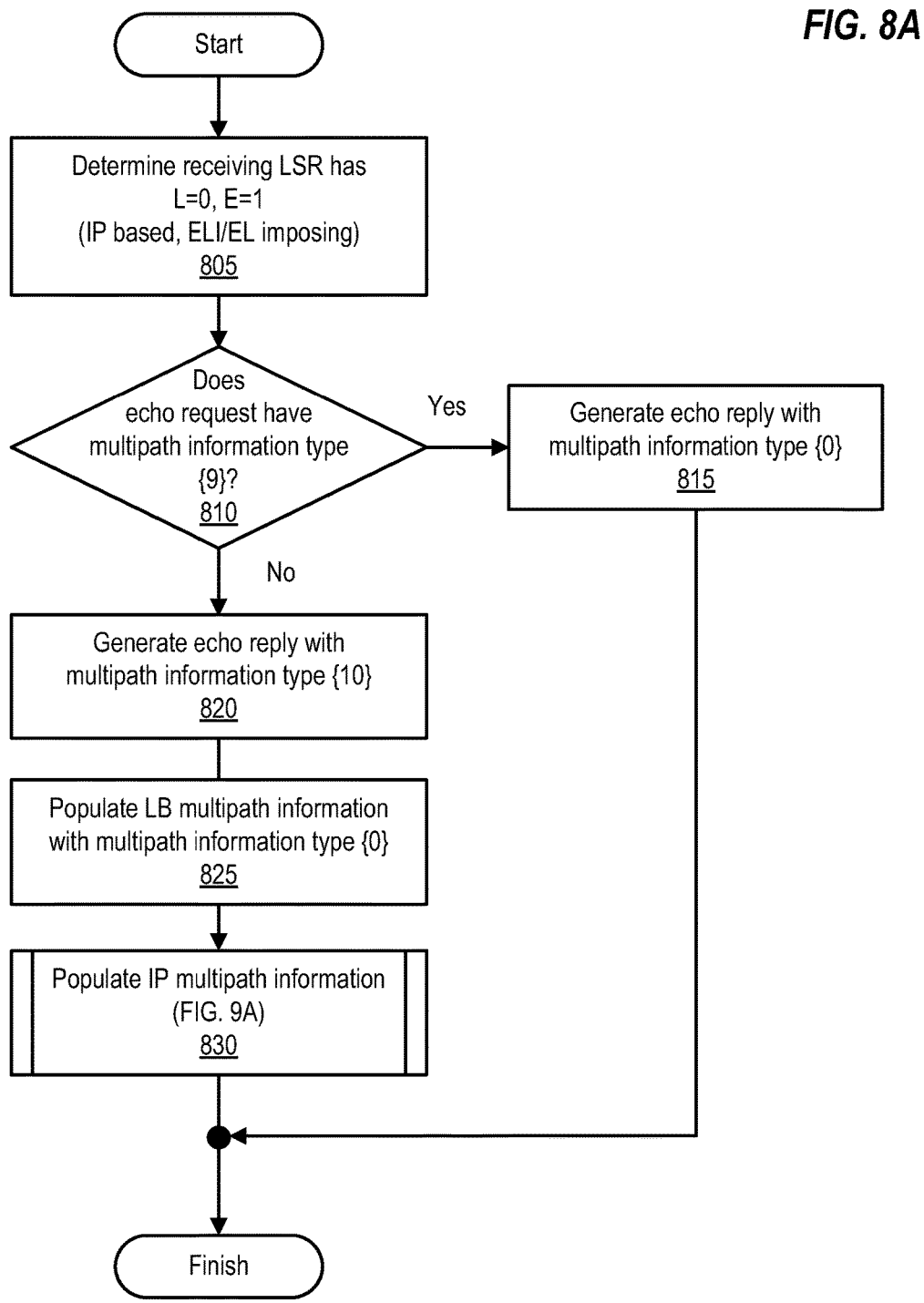
FIGS. 8A and 8B are flowcharts illustrating operations of example echo reply generation processes implemented by a responder node that imposes entropy labels, according to one embodiment.
Figure 8B:
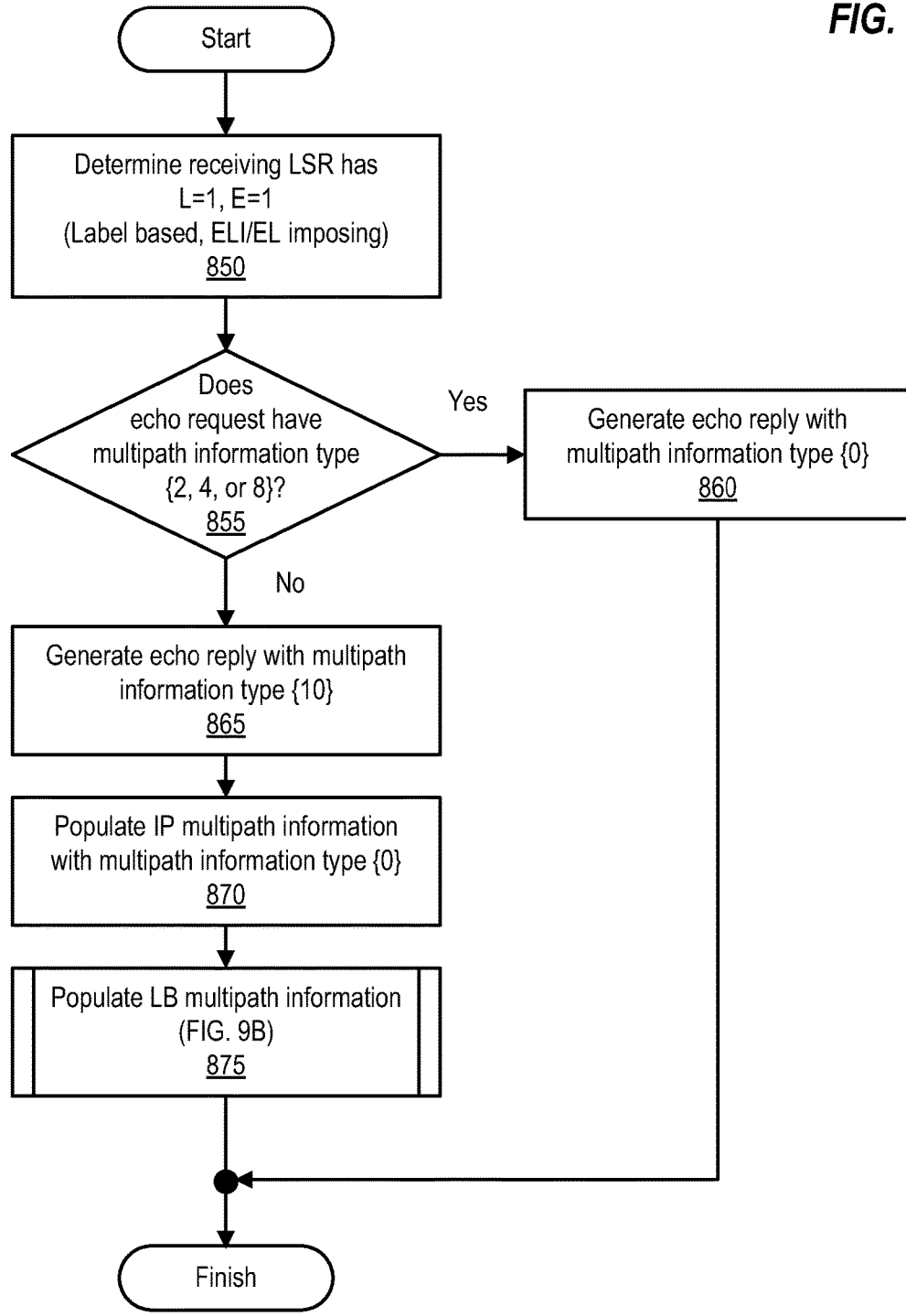

FIGS. 8A and 8B are flowcharts illustrating operations of example echo reply generation processes implemented by a responder node that imposes entropy labels. The process illustrated in FIG. 8A starts at operation 805, where the echo reply generator determines that the receiving LSR has a load balancing state of {L=0, E=1}, which indicates that the receiving LSR performs IP based load balancing (L=0) and imposes ELI/EL (E=1).

The process continues to operation 810, where the echo reply generator determines whether the received echo request includes multipath information type 9. If so, the process continues to operation 815, where the echo reply generator generates an echo reply message including multipath information type 0 (as similarly described in operation 715 of FIG. 7A), since the echo request includes a set of labels while the responding LSR implements IP based load balancing. The process then ends.

Returning to operation 810, if the echo request does not include multipath information type 9, the process continues to operation 820, where the echo request includes multipath information type {2, 4, 8, or 10}. In operation 820, the echo reply generator generates an echo reply with multipath information type 10. The process continues to operation 825, where the populator populates LB multipath information of the multipath type 10 element with multipath information type 0 (as similarly described in operation 730 of FIG. 7A), since the responding LSR implements IP based load balancing and cannot make any determination regarding a label set included in the echo request, if any is present. The process continues to operation 830, where the populator populates IP multipath information of the multipath type 10 element, as further described below in connection with FIG. 9A. The process then ends. In each echo reply generated in operation 815 and 820, the echo reply generator sets the new DS flags to reflect the state of the receiving LSR, which is {L=0, E=1}.

The process illustrated in FIG. 8B starts at operation 850, where the echo reply generator determines that the receiving LSR has a load balancing state of {L=1, E=1}, which indicates that the receiving LSR performs label based load balancing (L=1) and imposes ELI/EL (E=1). The process continues to operation 855, where the echo reply generator determines whether the received echo request includes multipath information type {2, 4, or 8}. If so, the process continues to operation 860, where the echo reply generator generates an echo reply with multipath information type 0 (as similarly described in operation 760 of FIG. 7B), since the echo request includes a set of IP addresses while the responding LSR implements label based load balancing. The process then ends.

Returning to operation 855, if the echo request does not include multipath information type {2, 4, or 8}, the process continues to operation 865, where the echo request includes multipath information type {0 or 9}. In operation 855, the echo reply generator generates an echo reply with a multipath type 10 element. The process continues to operation 870, where the populator populates IP multipath information of the multipath type 10 element with multipath information type 0 (as similarly described in operation 775 of FIG. 7B), since the responding LSR implements label based load balancing and cannot make any determination regarding an IP address set included in the echo request, if any is present. The process continues to operation 875, where the populator populates LB multipath information of the multipath information type 10 element, as further described below in connection with FIG. 8B. The process then ends. In each echo reply generated in operation 860 and 865, the echo reply generator sets the new DS flags to reflect the estate of the receiving LSR, which is {L=1, E=1}.

Figure 9A:
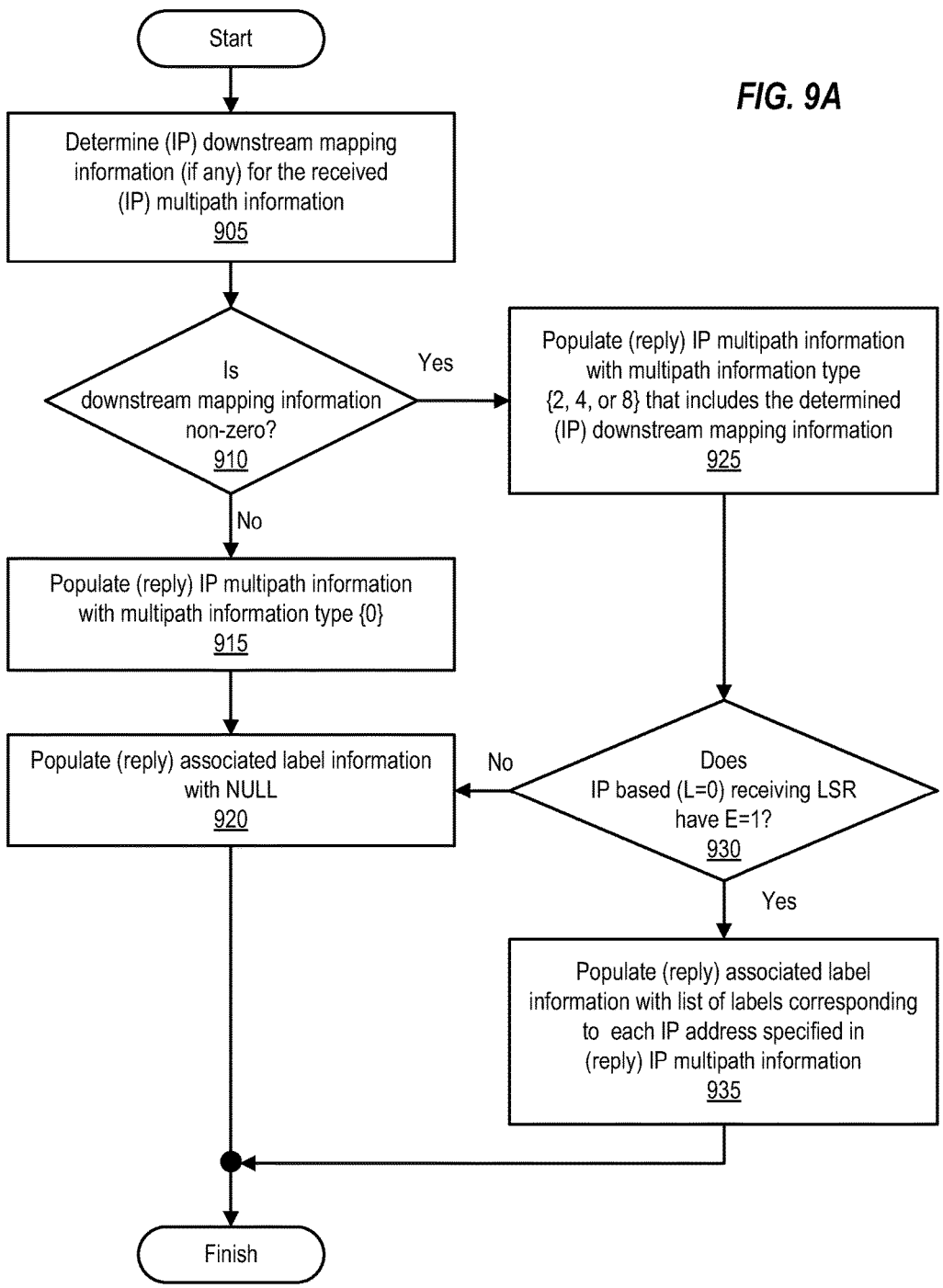
FIGS. 9A and 9B are flowcharts illustrating operations of example multipath type 10 element population processes implemented by a responder node, according to one embodiment.
Figure 9B:
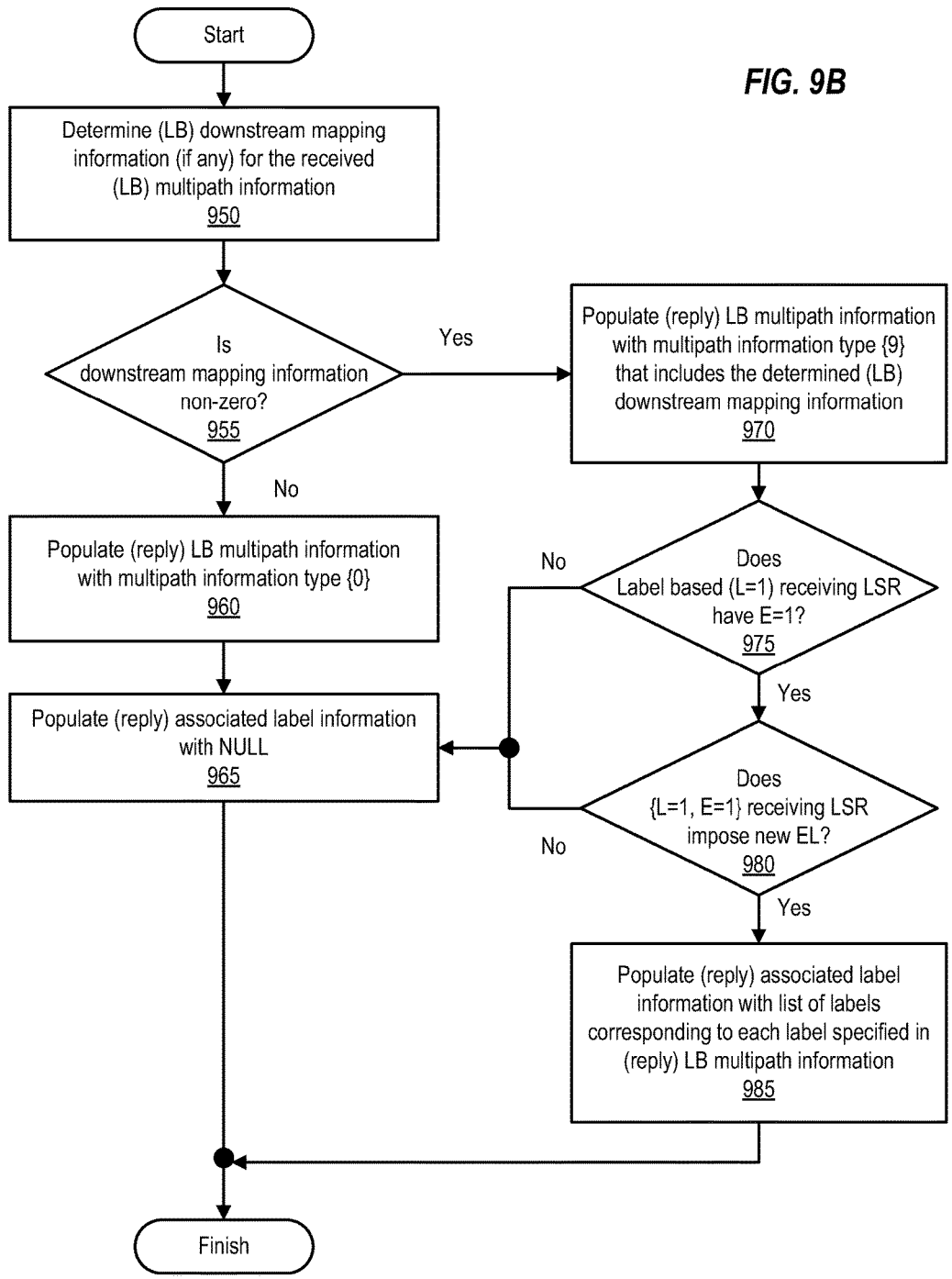

FIGS. 9A and 9B are flowcharts illustrating operations of example multipath type 10 element population processes implemented by a responder node or LSR. The process illustrated in FIG. 9A is implemented by a responder node that implements IP based load balancing. The process in FIG. 9A starts at operation 905, where the populator determines (IP) downstream mapping information (if any) for the (IP) multipath information received in the echo request. The received multipath information includes a set of IP addresses, which can be carried in the IP section of a multipath type 10 element or in multipath information of multipath type {2, 4, or 8}. The populator is configured to consult forwarding and/or routing tables to determine whether any of the received set of IP addresses map to, or match, any downstream LSRs of the receiving LSR.

The process continues to operation 910, where the populator determines whether the downstream mapping information is non-zero. If so, then at least one IP address that reaches a downstream LSR is found to map to at least one IP address of the set of IP addresses included in the received multipath information, and the process continues to operation 925. In operation 925, the populator populates the IP section of the multipath type 10 element that is included in the echo reply message (which is generated in either operation 725 of FIG. 7A or operation 820 of FIG. 8A). The IP section, including the IP multipath type, IP multipath length, and IP multipath information, is populated with the appropriate multipath information type {2, 4, or 8} that includes the downstream mapping information determined in operation 905, according to RFC 4379 and/or RFC 6424.

The process continues to operation 930, wherein the populator determines whether the receiving LSR (which performs IP based load balancing) imposes ELI/EL (E=1). If so, the process continues to operation 935, where the populator populates the associated label section of the multipath type 10 element. Since the receiving LSR imposes ELI/EL, the receiving LSR is aware of which entropy labels the receiving LSR will impose for each of the IP addresses included in the received IP multipath information. The receiving LSR determines a list of corresponding labels for each IP address specified in the (reply) IP multipath information, where each label maps to a specified IP address. If the received multipath information type is {10}, any label multipath information included in the received echo request message (which should include both IP multipath information and LB multipath information) is not used to determine the entropy labels associated with the received set of IP addresses (since the receiving LSP implements IP based load balancing). The associated label multipath information is populated with a list of entropy labels that correspond to each IP address specified in the IP section of the multipath type 10 element that is included in the echo reply message. The associated label multipath length is populated or set with a corresponding length value of the associated label multipath information. The process then ends.

Returning to operation 930, if the receiving LSR does not impose ELI/EL (E=0), the process continues to operation 920, where the populator omits the associated label section from the multipath type 10 element. In other words, the associated label multipath information is populated with NULL value and the associated label multipath length is set to zero. The process then ends.

Returning to operation 910, if the downstream mapping information is zero, or no matching IP address is found, the process continues to operation 915. In operation 915, the populator omits the IP section of the multipath type 10 element by populating the IP section with multipath information type 0. In other words, the IP multipath type is set to multipath type 0, IP multipath length is set to zero, and IP multipath information is populated with NULL value. The process continues to operation 920, where the populator omits the associated label section from the multipath type 10 element by populating the associated label multipath information with NULL value and setting the associated label multipath length to zero. The process then ends.

The process illustrated in FIG. 9B is implemented by a responder node that implements label based load balancing. The process illustrated in FIG. 9B starts at operation 950, where the populator determines (LB) downstream mapping information (if any) for the (LB) multipath information received in the echo request. The received multipath information includes a set of labels, which can be carried in the LB section of a multipath type 10 element or in multipath information of multipath type {9}. The populator is configured to consult forwarding and/or routing table sto determine whether any of the received set of labels map to, or match, any downstream LSRs of the receiving LSR.

The process continues to operation 955, where the populator determines whether the downstream mapping information is non-zero. If so, then at least one label that reaches a downstream LSR is found to map to at least one label of the set of labels included in the received multipath information, and the process continues to operation 970. In operation 970, the populator populates the LB section of the multipath type 10 element that is included in the echo reply message (which is generated in either operation 770 of FIG. 7B or 865 of FIG. 8B). The LB section, including the LB multipath type, LB multipath length, and LB multipath information, is populated with the appropriate multipath information type 9 that includes the downstream mapping information determined in operation 950, according to RFC 4379 and/or RFC 6424.

The process continues to operation 975, where the populator determines whether the receiving LSR (which performs label based load balancing) imposes ELI/EL (E=1). If the receiving LSR does not impose ELI/EL (E=0), the process continues to operation 965, where the populator omits the associated label section from the multipath type 10 element. In other words, the associated label multipath information is populated with NULL value and the associated label multipath length is set to zero. The process then ends.

Returning to operation 975, if the receiving LSR imposes ELI/EL (E=1), the process continues to operation 980, where the populator determines whether the receiving LSR imposes a new EL. If the receiving LSR does not impose a new EL (but instead imposes a carried-over EL received from the previous LSR on the LSP), the process continues to operation 965, where the populator omits the associated label section from the multipath type 10 element. The process then ends Returning to operation 980, if the receiving LSR imposes a new EL, the process continues to operation 985, where the populator populates the associated label section of the multipath type 10 element. Since the receiving LSR imposes ELI/EL, the receiving LSR is aware of which entropy labels the receiving LSR will impose for each of the labels included in the received label multipath information. Since the receiving LSR imposes a new EL, the receiving LSR also determines a list of corresponding (newly imposed) entropy labels for each label specified in the (reply) LB multipath information, where each label maps to a specified label. If the received multipath information type is {10}, any IP multipath information included in the received echo request message is not used to determine the entropy labels associated with the received set of labels (since the receiving LSP implements label based load balancing). The associated label multipath information is populated with a list of entropy labels that correspond to each label specified in the LB section of the multipath type 10 element that is included in the echo reply message. The associated label multipath length is populated or set with a corresponding length value of the associated label multipath information. The process then ends.

Returning to operation 955, if the downstream mapping information is zero, or no matching label is found, the process continues to operation 960, where the populator omits the LB section of the multipath type 10 element by populating the LB section with LB multipath information type 0. In other words, the LB multipath type is set to multipath type 0, LB multipath length is set to zero, and LB multipath information is populated with NULL value. The process continues to operation 965, where the populator omits the associated label section from the multipath type 10 element by populating the associated label multipath information with NULL value and setting the associated label multipath length to zero. The process then ends.

Figure 10:
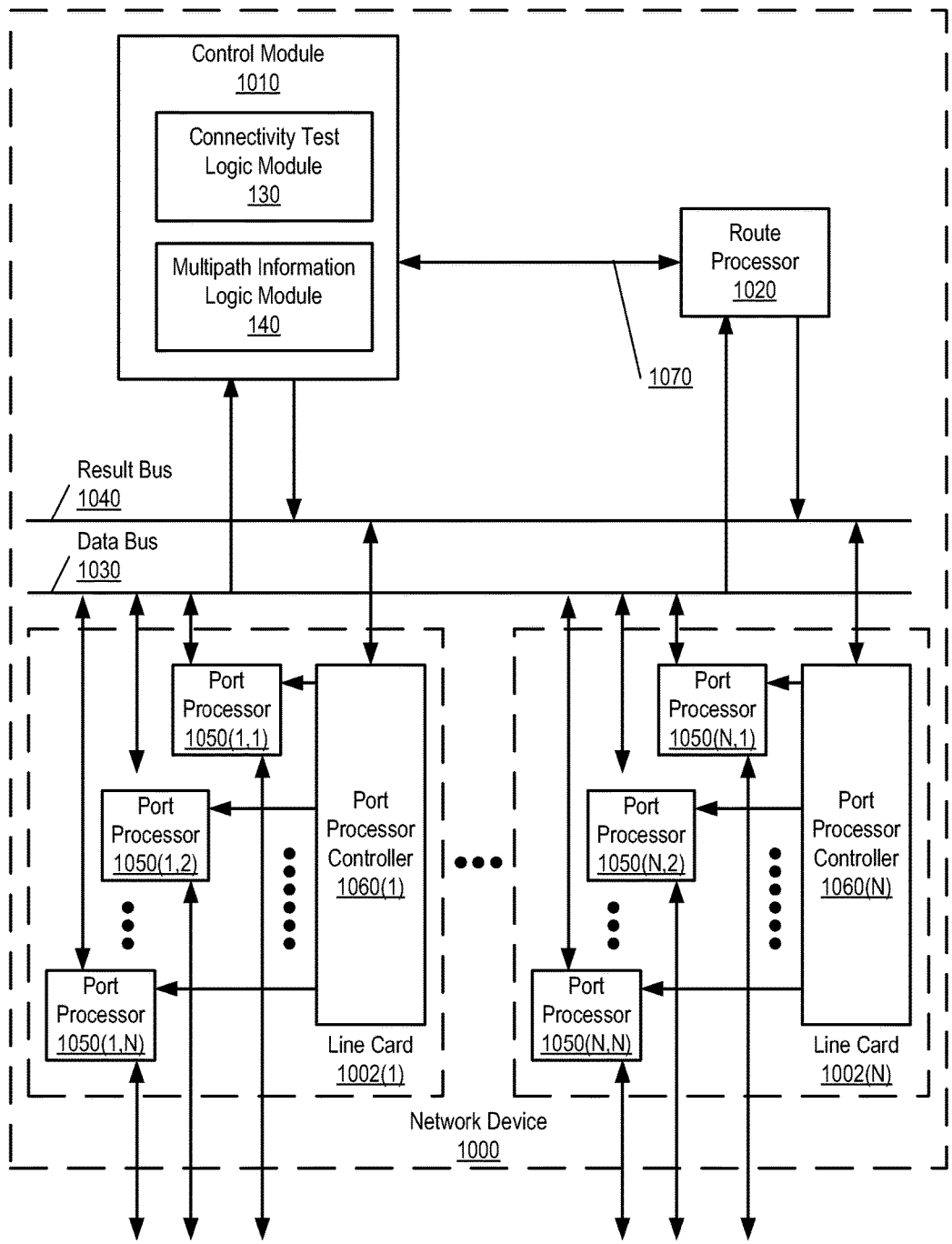
FIG. 10 is a block diagram illustrating components of an example network device in which the present disclosure can be implemented, according to one embodiment.

FIG. 10 is a block diagram illustrating components of an example network device 1000 configured as a routing device (e.g., label switching routing elements 120(1)-(N) of FIG. 1). In this depiction, network device 1000 includes a number of line cards (line cards 1002(1)-1002(N)) that are communicatively coupled to a control module 1010 (which can include a forwarding engine, not shown) and a route processor 1020 via a data bus 1030 and a result bus 1040. Line cards 1002(1)-(N) include a number of port processors 1050(1,1)-1050(N,N) which are controlled by port processor controllers 1060(1)-1060(N). It will also be noted that control module 1010 and route processor 1020 are not only coupled to one another via data bus 1030 and result bus 1040, but are also communicatively coupled to one another by a communications link 1070. It is noted that in alternative embodiments, each line card can include its own forwarding engine.

When a message (e.g., an echo request message and/or an echo reply message) is received by a network device such as network device 1000 (e.g., received by a label switching routing element 120), the message is identified and analyzed by the network device in the following manner. Upon receipt, a message (or some or all of its control information) is sent from one of the port processors 1050(1,1)-1050(N,N) at which the message was received to one or more of those devices coupled to data bus 1030 (e.g., others of port processors 1050(1,1)-1050(N,N), a forwarding engine, and/or route processor 1020). Handling of the message can be determined, for example, by a forwarding engine. For example, a forwarding engine may determine that the message should be forwarded to one or more of port processors 1050(1,1)-1050(N,N). This can be accomplished by indicating to corresponding one(s) of port processor controllers 1060(1)-1060(N) that the copy of the message held in the given one(s) of port processors 1050(1,1)-1050(N,N) should be forwarded to the appropriate one of port processors 1050(1,1)-1050(N,N).

Network device 1000 can implement connectivity test logic module 130 and/or multipath information logic module 140 in control module 1010 (as shown), or in one of port processor controllers 1060(1)-1060(N) and/or in route processor 1020 in order to implement the present disclosure. Although not shown, network device 1000 can also implement a routing protocol module and/or network reachability protocol module in control module 1010, in one of port processor controllers 1060(1)-1060(N), and/or in route processor 1020 (not shown).

An incoming message (e.g., an echo request message) can be provided to connectivity test logic module 130 via a forwarding engine or port processor of a line card coupled to a port that received the incoming message. Connectivity test logic module 130 is configured to perform connectivity test processing of the incoming message. Multipath information logic module 140 is configured to communicate with connectivity test logic module 130. If network device 1000 acts as an initiator node, multipath information logic module 140 is configured to process the incoming message and to generate (in cooperation with connectivity test logic module 130) an outgoing message (e.g., an echo request message), as described above in connection with FIG. 5A-5B. If network device 1000 acts as a responder node, multipath information logic module 140 is configured to generate (in cooperation with connectivity test logic module 130) an outgoing message (e.g., an echo reply message), as described above in connection with FIG. 6-9B. Multipath information logic module 140 is triggered in response to detection of initiation of a connectivity test at an initiator node, in response to receipt of an echo reply message at an initiator node, and in response to receipt of an echo request message at a responder node.

The outgoing message can be provided by connectivity test logic module 130 to a forwarding engine, which can determine that the outgoing message should be forwarded to one or more of port processors 1050(1,1)-1050(N,N) that are configured to transmit the outgoing message (e.g., transmitted to another network device) toward the outgoing message's destination (e.g., the initiator of the incoming message).

Figure 11:
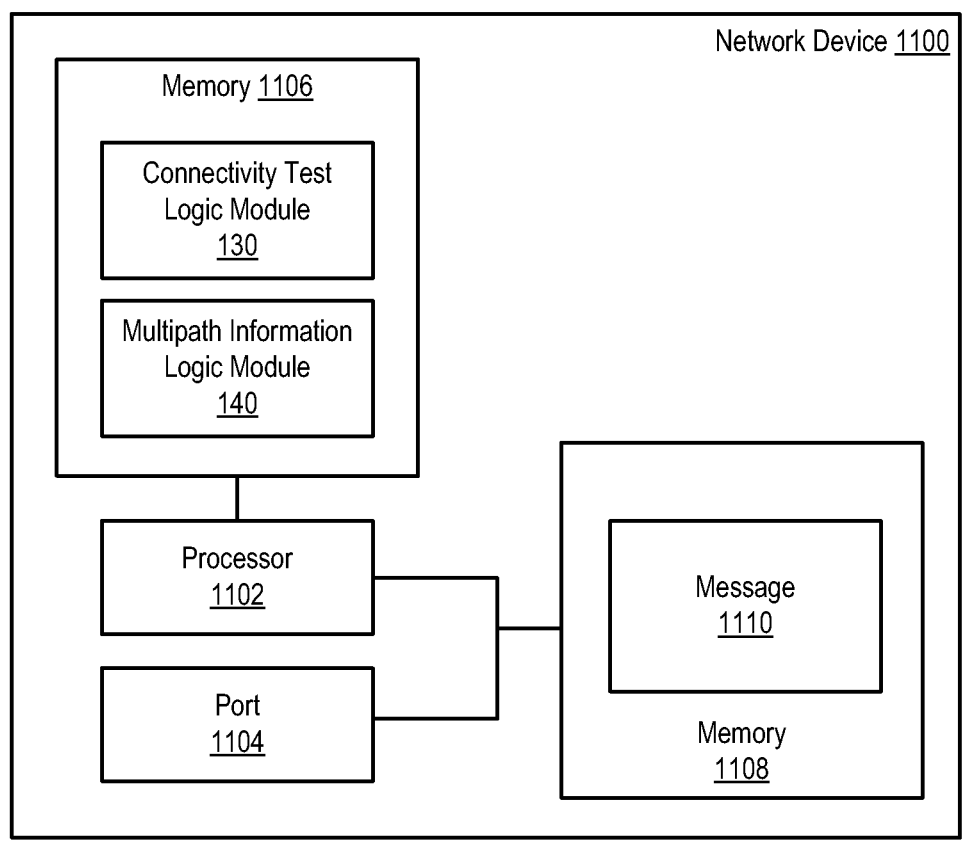
FIG. 11 is a block diagram illustrating components of an example network device in which the present disclosure can be implemented, according to one embodiment.

FIG. 11 is a block diagram illustrating components of an example network device 1100, in which the network device is configured as a routing device (e.g., label switching routing elements 120(1)-(N) of FIG. 1). As illustrated, network device 1100 includes one or more processors 1102 (e.g., microprocessors, PLDs (Programmable Logic Devices), or ASICs (Application Specific Integrated Circuits)) configured to execute program instructions stored in memories 1106 and/or 1108, which are computer readable storage media. Memories 1106 and 1108 can include various types of RAM (Random Access Memory), ROM (Read Only Memory), Flash memory, MEMS (Micro Electro-Mechanical Systems) memory, and the like. Network device 1100 also includes one or more ports 1104 (e.g., one or more hardware ports or other network interfaces that can be linked to other network devices, hosts, servers, storage devices, or the like). Processor 1102, port 1104, and memories 1106 and 1108 are coupled to send and receive data and control signals by one or more buses or other interconnects.

In this example, program instructions executable to implement connectivity test logic module 130 and/or multipath information logic module 140 are stored in memory 1106. Program instructions executable to implement a routing protocol module and/or a network reachability protocol module can also be stored in memory 1106 and/or in memory 1108 (not shown). Routing information and network reachability information can be stored in one or more routing tables and/or forwarding tables, including a label forwarding information base (LFIB) and/or one or more virtual routing/forwarding (VRF) tables configured in memory 1106 or 1108 (not shown).

Message 1110 (e.g., an echo request message and/or an echo reply message) is stored in memory 1108. In one embodiment, message 1110 can be received from port 1104 (e.g., received from another network device coupled to port 1104), and can be stored in memory 1108 before being provided to connectivity test logic module 130. Connectivity test logic module 130 includes functionality needed to perform connectivity test processing for an incoming message 1110 (e.g., an echo request message received at a responder node and an echo reply message received at an initiator node).

Multipath information logic module 140 includes functionality needed to communicate with connectivity test logic module 130 and to cooperatively generate (with connectivity test logic module 130) an outgoing message 1110 (e.g., an echo reply message or an echo request message), as described above in connection with FIG. 6-9B. In one embodiment, outgoing message 1110 can be generated and stored in memory 1108 before being transmitted via port 1104 (e.g., transmitted to another network device in the network that is coupled to port 1104).

Although the present disclosure has been described with respect to specific embodiments thereof, various changes and modifications may be suggested to one skilled in the art. It is intended such changes and modifications fall within the scope of the appended claims.

What is claimed is:

1. A method comprising:
   in response to an initiator node receiving a command to start a connectivity test for a label switched path (LSP), accessing state information stored in memory and determining whether the state information indicates that the LSP comprises an LSP segment that implements entropy label load balancing;
   in response to determining that the state information indicates that the LSP does not comprise an LSP segment that implements entropy label load balancing, the initiator node generating a first echo request message that comprises a first multipath information type;
   the initiator node transmitting the first echo request message to a first transit node of the LSP.

2. The method of claim 1 further comprising the initiator node initializing the state information to indicate the LSP does not comprise an LSP segment that implements entropy load balancing.

3. The method of claim 2 further comprising:
   in response to the initiator node receiving a first echo response from the first transit node, the initiator node updating the state information to indicate that the LSP comprises an LSP segment that implements entropy label load balancing;
   in response to updating the state information, the initiator node generating a second echo request message that comprises a second multipath information type;
   the initiator node transmitting the second echo request message to a second transit node of the LSP;
   wherein the first and second multipath information types are distinct from each other.

4. The method of claim 3 further comprising the initiator node copying multipath information from the first echo response to the second echo request before the initiator node transmits the second echo request.

5. The method of claim 4 further comprising the initiator node copying associated label information from the first echo response to the second echo request before the initiator node transmits the second echo request.

6. The method of claim 5 wherein the first echo reply comprises downstream mapping information and a set of entropy labels.

7. An initiator node comprising:
   a processor, and;
   an instruction memory coupled to the processor and configured to store instructions executable by the processor, wherein the processor is configured to implement a method in response to executing the stored instructions, the method comprising:
   accessing state information stored in memory and determining whether the state information indicates that a label switched path (LSP) comprises an LSP segment that implements entropy label load balancing;
   in response to determining that the state information indicates that the LSP does not comprise an LSP segment that implements entropy label load balancing, generating a first echo request message that comprises a first multipath information type, and;

transmitting the first echo request message to a first transit node of the LSP.

8. The initiator node of claim 7 wherein the method further comprises initializing the state information to indicate the LSP does not comprise an LSP segment that implements entropy load balancing.

9. The initiator node of claim 8 wherein the method further comprises:
in response to receiving a first echo response from the first transit node, updating the state information to indicate that the LSP comprises an LSP segment that implements entropy label load balancing;
in response to updating the state information, generating a second echo request message that comprises a second multipath information type;
transmitting the second echo request message to a second transit node of the LSP;
wherein the first and second multipath information types are distinct from each other.

10. The initiator node of claim 9 wherein the method further comprises copying multipath information from the first echo response to the second echo request before the initiator node transmits the second echo request.

11. The initiator node of claim 10 wherein the method further comprises copying associated label information from the first echo response to the second echo request before the initiator node transmits the second echo request.

12. The initiator node of claim 11 wherein the first echo reply comprises downstream mapping information and a set of entropy labels.

13. A non-transitory computer readable medium storing program instructions that, when executed on a processor of a network node, are configured to cause the processor to:
access state information stored in memory and determine whether the state information indicates that a label switched path (LSP) comprises an LSP segment that implements entropy label load balancing;
in response to determining that the state information indicates that the LSP does not comprise an LSP segment that implements entropy label load balancing, generating a first echo request message that comprises a first multipath information type;
transmit the first echo request message to a first transit node of the LSP.

14. The non-transitory computer readable medium of claim 13, wherein the program instructions are further configured to cause the processor to initialize the state information to indicate the LSP does not comprise an LSP segment that implements entropy load balancing.

15. The non-transitory computer readable medium of claim 14, wherein the program instructions are further configured to cause the processor to:
update the state information to indicate that the LSP comprises an LSP segment that implements entropy label load balancing in response to the network node receiving a first echo response from the first transit node;
in response to updating the state information, generate a second echo request message that comprises a second multipath information type;
transmit the second echo request message to a second transit node of the LSP;
wherein the first and second multipath information types are distinct from each other.

* * * * *